(12) United States Patent
Easley et al.

(10) Patent No.: US 12,112,339 B1
(45) Date of Patent: Oct. 8, 2024

(54) SOFTWARE-BASED COMPLIANCE EVALUATION TOOL

(71) Applicant: UIPCO, LLC, San Antonio, TX (US)

(72) Inventors: Jeffrey Walton Easley, San Antonio, TX (US); Kenneth Thomas, Boerne, TX (US); Dennis Gudenau, San Antonio, TX (US); Edward Michael Rizzolo, San Antonio, TX (US); Charles Sullivan Heath, Jr., San Antonio, TX (US); Abram Alian Maldonado, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 77 days.

(21) Appl. No.: 16/452,024

(22) Filed: Jun. 25, 2019

Related U.S. Application Data

(60) Provisional application No. 62/689,723, filed on Jun. 25, 2018.

(51) Int. Cl.
| | |
|---|---|
| *G06Q 30/018* | (2023.01) |
| *G06F 3/0481* | (2022.01) |
| *G06F 3/04842* | (2022.01) |
| *G06F 9/451* | (2018.01) |
| *G06F 16/13* | (2019.01) |
| *G06F 16/185* | (2019.01) |
| *G06F 40/174* | (2020.01) |

(52) U.S. Cl.
CPC ........ *G06Q 30/018* (2013.01); *G06F 3/0481* (2013.01); *G06F 9/451* (2018.02); *G06F 16/13* (2019.01); *G06F 16/185* (2019.01); *G06F 40/174* (2020.01); *G06F 3/04842* (2013.01)

(58) Field of Classification Search
CPC .... G06F 3/0481; G06F 3/04842; G06F 9/451; G06F 16/13; G06F 16/185; G06F 40/174; G06Q 30/018
See application file for complete search history.

(56) References Cited

U.S. PATENT DOCUMENTS

| | | | | |
|---|---|---|---|---|
| 6,380,928 B1 * | 4/2002 | Todd | ...... | G06Q 30/02 345/169 |
| 2003/0212615 A1 * | 11/2003 | Whitehead, Jr. | ...... | G06Q 20/40 705/30 |
| 2005/0193055 A1 * | 9/2005 | Angel | ...... | G06Q 30/02 709/204 |
| 2005/0203654 A1 * | 9/2005 | Shih | ...... | G05B 19/41865 700/100 |
| 2006/0089861 A1 * | 4/2006 | King | ...... | G06Q 10/06 705/4 |

(Continued)

*Primary Examiner* — Eric J. Bycer
(74) *Attorney, Agent, or Firm* — BakerHostetler

(57) ABSTRACT

Disclosed herein is a compliance evaluation system, which may implement a software-based compliance evaluation tool for accurate notation, capture, and reporting of all potential compliance problems within a technical, a procedural or a process domain associated with a software program. The compliance evaluation system may enable a rapid and pro-active response to reported potential compliance problems by routing the reported potential compliance problems to appropriate analyst computers before the potential compliance problems become real and serious for company and vendors.

18 Claims, 24 Drawing Sheets

(56) References Cited

U.S. PATENT DOCUMENTS

| | | | | |
|---|---|---|---|---|
| 2008/0005666 A1* | 1/2008 | Sefton | ............... | G06F 40/186 |
| | | | | 715/234 |
| 2008/0147774 A1* | 6/2008 | Tummalapenta | ..... | H04L 51/234 |
| | | | | 709/202 |
| 2008/0271110 A1* | 10/2008 | Graves | ............... | G06Q 10/10 |
| | | | | 726/1 |
| 2010/0077025 A1* | 3/2010 | Macurda | ............ | G06Q 10/06 |
| | | | | 709/223 |
| 2011/0022984 A1* | 1/2011 | van der Meulen | . | G06F 9/44526 |
| | | | | 715/830 |
| 2012/0265587 A1* | 10/2012 | Kinkead | ............ | G06Q 30/02 |
| | | | | 705/14.1 |
| 2013/0226833 A1* | 8/2013 | Allison | ............ | G06Q 30/018 |
| | | | | 705/36 R |
| 2013/0311224 A1* | 11/2013 | Heroux | .............. | G06Q 90/00 |
| | | | | 705/7.15 |
| 2014/0006296 A1* | 1/2014 | Hughes | ............ | A61F 13/4963 |
| | | | | 705/317 |
| 2014/0129457 A1* | 5/2014 | Peeler | ............... | G06Q 10/067 |
| | | | | 705/317 |
| 2014/0310052 A1* | 10/2014 | Foehr | ............ | G06Q 10/06316 |
| | | | | 705/7.26 |
| 2015/0227868 A1* | 8/2015 | Saraf | ............... | G06Q 10/0635 |
| | | | | 705/7.28 |
| 2016/0019644 A1* | 1/2016 | Boudreault | ............ | G06Q 40/04 |
| | | | | 705/37 |
| 2016/0124770 A1* | 5/2016 | Bouchard | ............ | G06N 7/005 |
| | | | | 718/103 |
| 2017/0032395 A1* | 2/2017 | Kaufman | ............ | G06F 3/0482 |
| 2018/0114237 A1* | 4/2018 | Kirk | ............... | H04L 63/0407 |

* cited by examiner

302

Compliance Evaluation Application
A. Set Up Process

| Question | Identifier | Score |
|---|---|---|
| Question 1 | First identifier | 3 |
| Question 2 | Second identifier | 7 |

Compliance Evaluation Application
A. Set Up Process

| Question | Answer | Score |
|---|---|---|
| Question 1 | Yes | Question 2 |
| Question 1 | No | Question 3 |

Compliance Evaluation Form

Personal 404 Information

Help 406

Sign Out 408

Product/Process Name 410

412
Question 1: What are current controls to prevent failure?

Answer 1: /Space to enter answer/
414

Next

FIG. 4

SOFTWARE-BASED COMPLIANCE EVALUATION TOOL

CROSS REFERENCES TO RELATED APPLICATIONS

This application claims priority to U.S. Provisional Patent Application No. 62/689,723, filed Jun. 25, 2018, which is hereby incorporated by reference in its entirety.

TECHNICAL FIELD

This application relates to a software-based compliance evaluation tool for evaluating software programs.

BACKGROUND

A company may have various vendors, which may use their software programs. During operations, some vendors may experience compliance problems with respect to the software programs. In order to avoid such circumstances, the company may implement preventive processes to perform a compliance evaluation of the software programs. For instance, the company may execute a risk and control self-assessment (RCSA) process, which may enable identification of potential compliance problems associated with each software program. Conventional RCSA process may facilitate a form-filling exercise. An employee of the company may submit sufficient information in the form-filling exercise to effectively define each potential compliance problem associated with each software program. Such form-filling exercise may ensure that each potential compliance problem is defined and recorded. However, the problem with the conventional RCSA process is that because of varied experience, knowledge, and skill of different employees who in most cases are not compliance evaluation professionals may result in a wide-ranging quality of RCSA results. Since RCSA process is an important first step for determining and management of the potential compliance problems, improper RCSA results may have a cascading effect on controls and testing needed to manage overall compliance systems.

The conventional RCSA process may further facilitate a creation of a notification corresponding to some of the potential compliance problems recorded during the form-filling exercise. Typically, these notifications are assigned to analysts who are tasked with addressing these notifications. However, the sheer volume of the notifications may create a problem. This is because processing a large volume of notifications may require high processing power. It is also highly undesirable because the company may have to designate a large portion of their computing infrastructure to process the notifications and such a process is inevitably expensive.

The conventional RCSA process may utilize a distribution method where the notifications are randomly assigned to the analysts. Such distribution method may lead to assigning of the notifications to wrong analysts. In such instances, some of the notifications may have to be reassigned to other analysts. This may lead to more inefficient utilization of the computing infrastructure, which is already under stress.

SUMMARY

What is therefore needed is a compliance evaluation system, which may implement a software-based compliance evaluation tool for accurate notation, capture, and reporting of all potential compliance problems within a technical, a procedural or a process domain associated with a software program. The compliance evaluation system may be configured for a rapid and pro-active response to reported potential compliance problems by routing the reported potential compliance problems to appropriate analyst computers before the potential compliance problems become real and serious for company and vendors.

In one embodiment, a server-implemented method may include, for each of a plurality of software programs, generating, by a server for transmission to one of a plurality of user devices, a questionnaire by executing a hierarchy file that contains a structure for respective paths and sequences of user interfaces for presentation on the user device receiving the questionnaire and dynamically adjusts the questionnaire based upon input from the user device; executing, by the server, one or more scoring algorithms to score each input from each questionnaire presented on each user device; generating, by the server, one or more requests based on a score associated with each input from the questionnaire for each software program, wherein the one or more requests comprises a first request based on a first input representing a first attribute of a first software program and a second request based on a second input representing a second attribute of the first software program; and routing, by the server, the first request to a first analyst computer configured to perform a first verification on the first request and the second request to a second analyst computer configured to perform a second verification on the second request.

In another embodiment, a system may include a server configured to: for each of a plurality of software programs, generate for transmission to one of a plurality of user devices, a questionnaire by executing a hierarchy file that contains a structure for respective paths and sequences of user interfaces for presentation on the user device receiving the questionnaire and dynamically adjusts the questionnaire based upon input from the user device; execute one or more scoring algorithms to score each input from each questionnaire presented on each user device; generate one or more requests based on a score associated with each input from the questionnaire for each software program, wherein the one or more requests comprises a first request based on a first input representing a first attribute of a first software program and a second request based on a second input representing a second attribute of the first software program; and route the first request to a first analyst computer configured to perform a first verification on the first request and the second request to a second analyst computer configured to perform a second verification on the second request.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 3A shows a first graphical user interface of an admin device, according to an embodiment.

FIG. 3B shows a second graphical user interface of an admin device, according to an embodiment.

FIG. 4 shows a graphical user interface displaying a software-based compliance evaluation tool launched on a user device, according to an embodiment.

DETAILED DESCRIPTION

Figure 1:
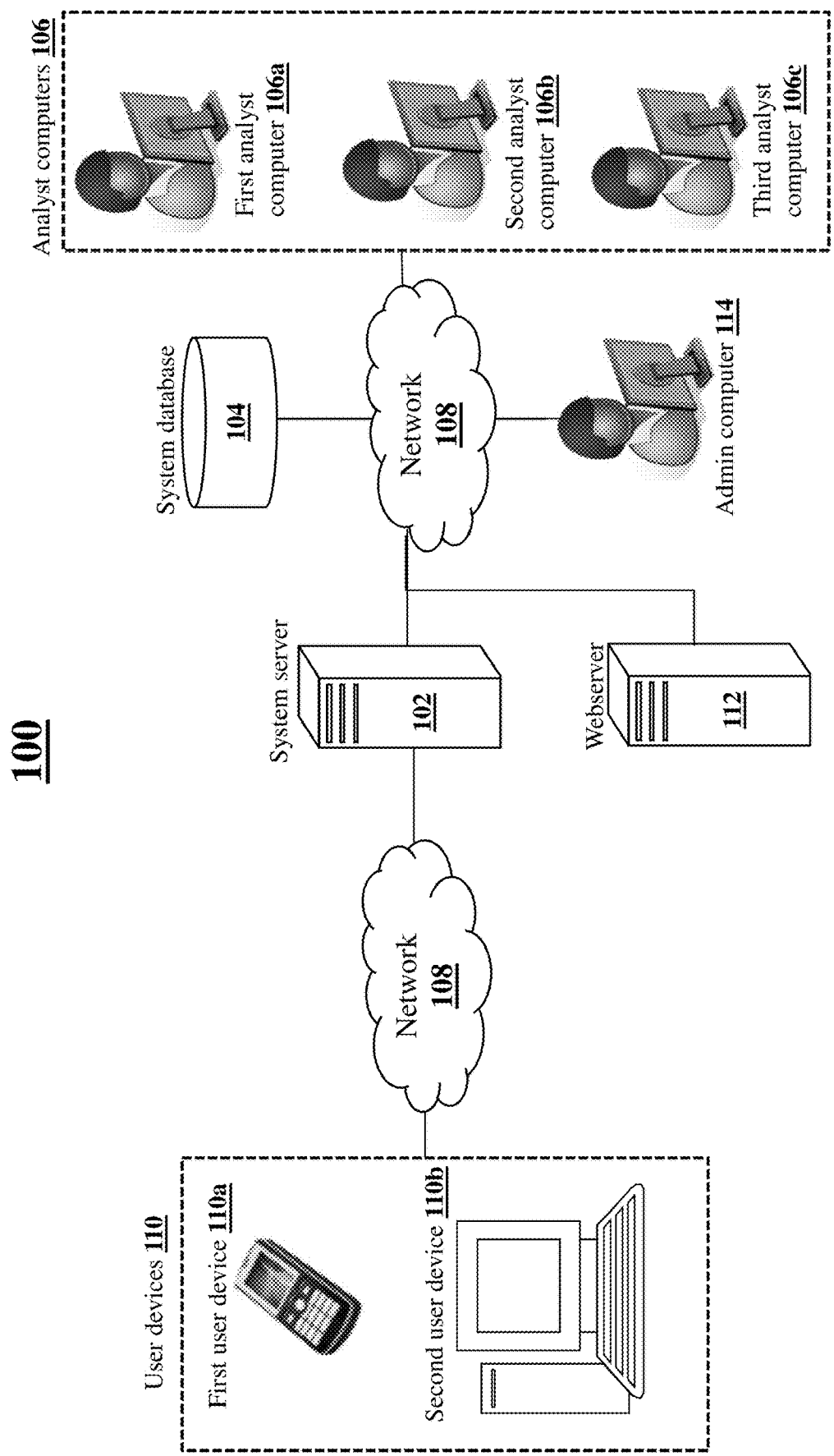
FIG. 1 shows a system for evaluating software programs, according to an embodiment.

Reference will now be made to the embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is described in detail with reference to embodiments illustrated in the drawings, which form a part here. Other embodiments may be used and/or other changes may be made without departing from the spirit or scope of the present disclosure. The embodiments described in the detailed description are not meant to be limiting of the subject matter presented here.

FIG. 1 shows components of a system 100. The system 100 may include one or more system servers 102, one or more system databases 104, one or more analyst computers 106, one or more user devices 110, one or more webservers 112, and one or more admin computers 114.

The system 100 may operate in a context of computer-executable instructions, such as program modules. A server computer, such as the system server 102 may execute the program modules. The program modules may include programs, objects, components, data structures, etc. that perform software compliance evaluation tasks or implement particular abstract data types. The features of the system 100 may function either in a computing device or in a distributed computing environment, where the processing devices may perform the software compliance evaluation tasks. In a distributed computing environment, program modules may be located in both local and remote computer storage media including memory storage devices.

The system server 102, the system database 104, the analyst computers 106, the user devices 110, the webserver 112, and the admin computer 114 communicate with each other over a network 108. The network 108 may include, but is not limited to, a private or public local area network, a wireless local area network, a metropolitan area network, a wide-area network, and Internet. The network 108 may further include both wired and wireless communications according to one or more standards via one or more transport mediums. The communication over the network 108 is in accordance with various communication protocols, such as transmission control protocol and internet protocol, user datagram protocol, and institute of electrical and electronics engineers communication protocols. The network 108 may further include wireless communications according to Bluetooth® specification sets, or another standard or proprietary wireless communication protocol. The network 108 may further include communications over a cellular network, including, for example, a global system for mobile communications, code division multiple access, and enhanced data for global evolution network.

In operation, a first user device 110a operated a first user (for example, a first vendor using a first software program) may access and execute a software-based compliance evaluation tool (for example, a software-based compliance evaluation application) on a first user interface of the first user device 110a to submit answers in an electronic compliance evaluation form, which may be in form of a first questionnaire associated with the first software program. The webserver 112 may host the software-based compliance evaluation application, which is accessible on the first user device 110a via the network 108. While working on the first questionnaire, the first user device 110a may require assistance of a second user device 110b. The first user device 110a may communicate with the second user device 110b via the webserver 112 to share a portion of the first questionnaire and request the second user device 110b to answer some questions in that portion of the first questionnaire.

The first user interface of the first user device 110a may present a first question of the first questionnaire associated with the first software program. The first questionnaire may focus on questions associated with various compliance indicators and compliance components associated with the first software program. The first questionnaire may include one or more closed ended questions, which may be limited to "Yes" or "No" responses. The first questionnaire may include one or more open-ended questions, which may focus on obtaining various types of information from the first user device 110a.

The first questionnaire may be associated with a hierarchy file. The hierarchy file may include a tree structure, which may include various branches defining respective paths and sequences of user interfaces to a specific user interface (showing a specific question) to be presented on the first user device 110a depending on how the first user device 110a responds to certain questions of the first questionnaire presented within prior or current user interfaces on the first user device 110a. For instance, upon execution of the software-based compliance evaluation application, a series of user interfaces with questions associated with the first questionnaire related to the first software program is presented on the first user device 110a, and the first user operating the first user device 110a may navigate various user interfaces displaying various questions. The various user interfaces may be organized in a hierarchical structure, which may include branches or nodes that are part of a pre-determined sequences of the user interfaces for different questions.

When a first answer is submitted for the first question presented on the first user interface of the first user device 110a, a second user interface is presented on the first user device 110a displaying a second question. The second question is selected based on the first answer and the hierarchy file. The first user device 110a may submit inputs for each incoming question while following the path or the pre-determined sequence of the user interfaces presenting each incoming question based on evaluation of inputs or responses to previous questions in relation to the hierarchy file. The first user device 110a upon completing the first questionnaire related to the first software program along one path, on-line software-based compliance evaluation application may begin again at a parent branch or node for a second questionnaire related to a second software program such that a sequence of the user interfaces related to the second questionnaire is then presented on the first user device 110a until the second questionnaire is completed.

When the first questionnaire associated with the first software program is completed, the system server 102 may retrieve all inputs and responses submitted by the first user device 110a and store the inputs and the responses in the system database 104 for further analysis and processing. The system server 102 may analyze the inputs to each question in the first questionnaire to determine whether the inputs contain attributes matching known compliance related attributes, and thereby determining any compliance evaluation information associated with the inputs.

The system server 102 may execute one or more software models on determined compliance evaluation information to generate a score such as, a compliance score based on various compliance factors associated with the compliance evaluation information. The one or more software models may employ machine-learning techniques to differentiate contemporaneous trends from true events. For instance, the software models may use algorithms and computational methods, which may allow the system server 102 to discover patterns in data associated with the compliance evaluation information, without being explicitly programmed to find said patterns. The methodology may involve a learning phase, in which the system server 102 may learn by experience with a data sample, creates a corresponding software model, and, if the software models are further validated, continues to use and improve upon the software models for future validation of the compliance evaluation information. This allows the software models to automatically validate new compliance evaluation information and tune it accordingly.

The system server 102 may sort features of the compliance evaluation information according to a priority based on relative scores. Periodically or in response to triggering condition, the system server 102 may update the scores of the features of the compliance evaluation information as the system server 102 detects more compliance evaluation information associated with the inputs. The system server 102 may process the compliance evaluation information and their associated scores to generate requests. The requests may include alerts and notifications to resolve various compliance factors and indicators within the compliance information associated with the inputs. The system server 102 may further assign a priority level to each request based on a relative likelihood of an occurrence of a risk because of underlying compliance factors and indicators.

The system server 102 may pre-process the different requests and then route the different requests to appropriate analyst computers 106 for performing verification of the requests. The system server 102 may route the different requests to the appropriate analyst computers 106 according to a priority level associated with the requests and credentials associated with each analyst. Each analyst computer 106 may generate an analyst queue model, which may include a queue that may be populated with incoming requests from the system server 102. Each queue may contain a list of requests of a certain compliance problem.

An Admin computer 114 may be a portable or non-portable electronic device such as, a desktop computer, a laptop computer, a tablet computer, a smart phone, or the like. The admin computer 114 may include a processor, which may perform one or more operations according to one or more programming instructions. The admin computer 114 may be capable of communicating with the system server 102 and the webserver 112 through the network 108 using wired or wireless communication capabilities. For ease of explanation, FIG. 1 shows a single computing device functioning as the admin computer 114. However, it should be appreciated that some embodiments may include multiple computing devices functioning as the admin computer 114 capable of performing various tasks described herein.

The admin computer 114 may include one or more input and output devices to allow an administrator to generate and configure a software-based compliance evaluation application. The software-based compliance evaluation application may present questionnaires associated one or more software programs. Each questionnaire may assist in gathering compliance evaluation data corresponding to a software program from user devices 110 interacting with the questionnaire via the software-based compliance evaluation application.

In order to create a software version of each questionnaire, the admin computer 114 may generate a graphical user interface (for example, a first graphical user interface), which may display a first plurality of input fields. The first plurality of input fields may be arranged in multiple rows and columns. The first plurality of input fields, which may be arranged in one of the multiple rows and columns may include a first input field configured to receive an alphanumerical string representing a first question of one or more questions of a questionnaire, a second input field configured to receive an identifier corresponding to the first question, and a third input field configured to receive a score associated with the first question.

Table 1 (as depicted in FIG. 3A) and shown below depicts inputs for each of the first plurality of input fields displayed on a first graphical user interface 302 of the admin computer 114.

| First field (Question) | Second field (Identifier) | Third field (Score) |
|---|---|---|
| Question 1 | First identifier | 3 |
| Question 2 | Second identifier | 7 |

The admin computer 114 may generate another graphical user interface (for example, a second graphical user interface), which may display a second plurality of input fields configured to receive identifiers for the one or more questions and a selection of a corresponding next question of the questionnaire based on a response to the first question.

Table 2 (as depicted in FIG. 3B) and shown below depicts inputs for each of the second plurality of input fields displayed on a second graphical user interface 304 of the admin computer 114.

| First field (Question) | Second field (Answer) | Third field (Next question) |
|---|---|---|
| Question 1 | Answer: Yes | Question 2 |
| Question 1 | Answer: No | Question 3 |

Referring back to the FIG. 1, the admin computer 114 may generate a hierarchy file corresponding to the questionnaire using the information in the first graphical user interface and the second graphical user interface. The hierarchy file may be a data file. The admin computer 114 may generate the hierarchy file using inputs received (as shown in table 1 and table 2) in response to information in the first and the second user interfaces. The hierarchy file may define a relationship and structure for respective paths and sequences of user interfaces to be presented on the software-based compliance evaluation application depending on input responses to one or more questions presented within prior or current user interfaces associated with the software-based compliance evaluation application. The admin computer 114 may store the hierarchy file for each questionnaire in the system database 104.

User devices 110 may be portable or non-portable electronic devices. The user devices 110 may include a processor, which is configured to perform one or more operations according to one or more programming instructions. The user devices 110 may be capable of communicating with the system server 102 and the webserver 112 through the network 108 using the wired or wireless communication capabilities. Non-limiting examples of the user devices 110 may include a first user device 110a (e.g., cellular telephone, smartphone), a second user device 110b (e.g., desktop, laptop, server, tablet), or any other telecommunications or computing device.

The user devices 110 may include one or more input and output devices to allow users (for example, vendors) to interact with the software-based compliance evaluation tool, which may be hosted by the webserver 112 or the admin computer 114 to assist gather compliance evaluation data from the users interacting with the software-based compliance evaluation tool.

In operation, the first user device 110a may execute the software-based compliance evaluation tool, such as an online software-based compliance evaluation application that accesses and presents a web application executed by the webserver 112 on a user interface of the first user device 110a. The web application may allow a first user to perform one or more operations such as, providing responses to questions in the questionnaire presented via the web application. A non-limiting example of the questionnaire may be a compliance evaluation form 402 (as depicted in the FIG. 4). The compliance evaluation form 402 may display various fields, such as a personal information field 404, a help information field 406, a signing-out field 408, a software program/process name field 410, an question field (displaying at least one question such as "What are current controls to prevent failure") 412, and an answer field (to receive answers from a user for the at least one question) 414. The first user device 110a may provide one or more inputs in the "answer field" corresponding to the question in the "question field" by interacting with the various fields of the compliance evaluation form 402 via an input device such as, a touch screen, a mouse, a keyboard, a keypad of the user device 110. After inputting each input in the answer field 414, the first user of the first user device 110a may click on a next button to submit the input and receive a second question.

The second question may be presented based on the hierarchy file and previous input. For instance, when the first user device 110a submits an input in the answer field 414 of the compliance evaluation form 402, the system server 102 may receive the input. The system server 102 may process the input to determine a next or a second question to be displayed in the "question field" of the compliance evaluation form 402. The system server 102 may determine the second question based on a hierarchy file defining a structure for respective paths and sequences of user interfaces of the user device 110 displaying questions to be presented on the compliance evaluation form 402 depending on input responses to the one or more questions presented within prior or current user interfaces associated with the compliance evaluation form 402. In one non-limiting example, when the user submits the input in the answer field 414 as ABC, a subsequent question may be about a first product based upon the hierarchy file and the ABC. However, when the user submits the input in the answer field 414 as XYZ, the subsequent question may be about a second product based upon the hierarchy file and the XYZ.

A system server 102 may be a computing device comprising a processor and non-transitory machine-readable storage medium. The system server 102 may be capable of performing various tasks and processes described herein. Non-limiting examples of the system server 102 may include a desktop computer, a server computer, a laptop computer, a tablet computer, or the like. For ease of explanation, FIG. 1 shows a single computing device functioning as the system server 102. However, it should be appreciated that some embodiments may include multiple computing devices functioning as the system server 102 capable of performing various tasks described herein.

The system server 102 may receive information associated with inputs in the questionnaire from the software-based compliance evaluation tool being executed on the first user device 110a. The system server 102 may detect a compliance attribute based on processing of the information associated with the inputs in the questionnaire. For instance, the system server 102 may execute various processes on the information associated with the inputs in the questionnaire to identify an associated user, an associated first user device 110a, and determining a particular scenario having attributes in the information associated with the inputs matched to known compliance attributes. The system server 102 may include a set of one or more scenario attribute models, which may indicate to the system server 102 whether a particular type of compliance attribute is potentially detected in the information associated with the inputs. Scenario models may be computer files stored on the system server 102 or separate database device, such as the system database 104, and include a set of compliance attributes that indicate a type of scenario of potential compliance indicators. In such implementations, the system server 102 may identify data field entries in the information associated with the inputs to identify one or more matches to corresponding known compliance attributes in the scenario models.

The system server 102 upon determining one or more known compliance attributes in the information associated with the inputs may execute a scoring model on each input, which may contain the one or more known compliance attributes to generate a score for each such input. The score may be a compliance score, and has a numerical value. The scoring model may be a non-linear statistical data model that calculates the score associated with a risk which may occur because of the one or more known compliance attributes. The non-linear statistical data model may include neural networks, decision trees, Bayesian networks, genetic algorithms, or other types of non-linear statistical data models.

The system server 102 upon generating the score for each input may generate requests corresponding to each score input, which may contain the one or more known compliance attributes. Each request may include an alert or a notification. The alert may be a log file or other machine-readable code containing various data fields. A first data field may describe information about the one or more known compliance attributes detected in each input. A second data field may describe information about the first user device 110a.

The system server 102 may determine a priority score for each request based on an algorithm that the system server 102 applies to the data fields associated with information underlying each request. The system server 102 may determine the priority score for each request based on the algorithm, such as a non-linear statistical data model that calculates the priority score. The non-linear statistical data model may include neural networks, decision trees, Bayesian networks, genetic algorithms, and several other types of non-linear statistical data models.

The system server 102 may update the priority score for each request at a predetermined interval (e.g., every few minutes). In some cases, the system server 102 may update the priority score for each request in response to a triggering event, such as receiving a new information underlying the particular request and/or a notification for a user identifier associated with the existing request, or when a threshold number of requests have been received. The system server 102 may sort the requests according to the priority score, such that the requests may be presented on a graphical user interface of analyst computers 106 in order of priority as indicated by the relative priority scores.

A webserver 112 may be a computing device hosting a software tool accessible to the user devices 110 via the Internet. The software tool may be a software-based compliance evaluation tool accessible to the user devices 110 via the Internet. The software-based compliance evaluation tool may be a software-based compliance evaluation application or a software-based compliance evaluation website. The webserver 112 may include a processor and non-transitory machine-readable storage capable of executing various tasks described herein. Non-limiting examples of the webserver 112 may include workstation computers, laptop computers, server computers, laptop computers, and the like. While system 100 includes a single webserver 112, in some embodiments the webserver 112 may include multiple computing devices operating in a distributed computing environment.

The webserver 112 may execute programs configured to host the software-based compliance evaluation tool (e.g., Apache®, Microsoft IIS®), which may generate and serve software-based compliance evaluation applications and webpages on the user devices 110 of the users. The software-based compliance evaluation applications and webpages may present questionnaires, and access data stored on the system database 104 or any external databases.

The webserver 112 may be configured to require user authentication based upon a set of user authorization credentials (e.g., username, password, biometrics, cryptographic certificate) received from the user devices 110. In such implementations, the webserver 112 may access the system database 104 configured to store user credentials, which the webserver 112 may be configured to reference in order to determine whether a set of entered credentials purportedly authenticating the user match an appropriate set of credentials that identify and authenticate the user. Similarly, in some implementations, the webserver 112 may generate and serve the software-based compliance evaluation applications and webpages on the user devices 110 based upon a user role (e.g., vendor, administrator, employee) within the system 100. In such implementations, a user role (for example, a vendor) may be defined by data fields in the user records stored in the system database 104, and the webserver 112 may authenticate the user and the user role by executing an access directory protocol. For instance, the webserver 112 may generate content on the software-based compliance evaluation applications and webpages displayed on the first user device 110a according to a first user role defined by a first user record of a first user of the first user device 110a in the system database 104.

Analyst computers 106 may be portable or non-portable electronic devices. The analyst computers 106 may include processors, which may be configured to perform one or more operations according to one or more programming instructions. The analyst computers 106 may be capable of communicating with the system server 102 and the webserver 112 through the network 108 using the wired or wireless communication capabilities. Non-limiting examples of the analyst computers 106 may include a first analyst computer 106a (e.g., desktop, laptop, server, tablet), a second analyst computer 106b (e.g., desktop, laptop, server, tablet), and a third analyst computer 106c (e.g., desktop, laptop, server, tablet).

The analyst computers 106 may include one or more input and output devices, which may allow the analysts to process and verify the requests stored in the system database 104. The system server 102 may store the requests in the system database 104. Software executed on the analyst computers 106 may allow each analyst to select a request from the system database 104 assigned to the analyst and then review or update underlying information associated with the request. In one non-limiting example, the first analyst computer 106a may select a first request assigned to the first analyst computer 106a from a queue, which may be a highest priority item among all other requests assigned to the first analyst computer 106a. For instance, based on the priority score associated with each request, the first analyst computer 106a may present a first analyst with the first request, which has to be addressed first. The priority score may prioritize different requests within the queue. The priority score of the requests may be continually updated, and thus the prioritization of the requests within the queue.

The analyst computers 106 may directly receive the requests from the system server 102 that are related to a subject matter (e.g., type of request) or a procedural role (e.g., time-sensitive request) associated with the respective analyst. In some implementations, the requests may have one data field indicating a nature of a request and another data field indicating a time-sensitive nature or user-sensitive nature of the request. Based on the data fields associated with the requests, each analyst computer 106 may receive the requests having subject matter or procedural data fields associated with respective analyst credentials.

The analyst computers 106 may mark or tag each received request. In some embodiments, the system server 102 may mark or tag the request, and transmit the tagged request to the analyst computer 106. For instance, the system server 102 may execute various data models that indicate to the system server 102 that a particular request should be tagged. The system server 102 may then automatically tag the request when data fields in the request matches a threshold number of data fields of a given data model. The tag may indicate web address of information about some resources, which may be helpful to verify the requests.

A system database 104 may be hosted on a server, such as the system server 102. The system database 104 may be capable of storing information associated with the inputs to the questionnaire in a plain format or an encrypted version. The system database 104 may be in communication with a processor of the system server 102 where the processor is capable of executing the various commands of the system 100. The system database 104 may be part of the system server 102. The system database 104 may be a separate component in communication with the system server 102.

The system database 104 may further store data records associated with various aspects of the application services offered to the users. Non-limiting examples of what may be stored in the system database 104 may include user records that may include data fields describing users, e.g., user data, such as user credentials (e.g., username, passwords, biometrics, encryption certificates), user account data, user roles, or user permissions; user responses to questionnaire; information associated with compliance components; document records that may comprise machine-readable computer files (e.g., word processing files), parsed portions of such computer files, or metadata associated with computer files; and application data that may include software instructions or data used by the applications (for example, software-based compliance evaluation applications).

Figure 2:
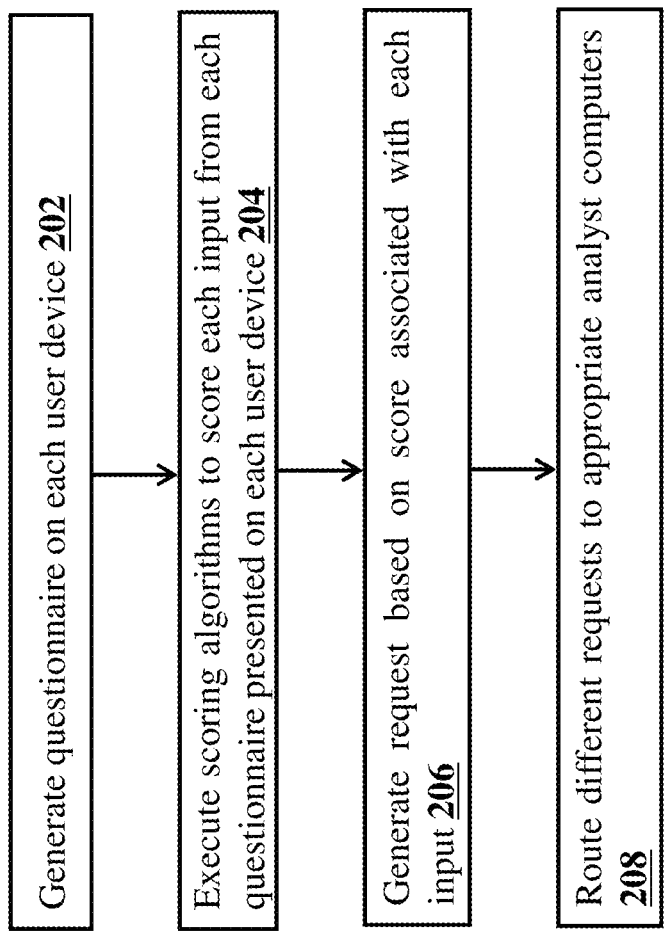
FIG. 2 shows execution of a method for evaluating software programs, according to an embodiment.

FIG. 2 shows execution steps of a method 200 for evaluating software programs. The method 200 shown in FIG. 2 comprises execution steps 202, 204, 206, and 208. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a single server computer, referred to as a system server in this embodiment. However, in some embodiments, steps may be executed by multiple computing devices operating in a distributed computing environment. In some cases, a computer executing one or more steps may be programmed to execute various other, unrelated features, where such computer does not need to be operating strictly as the system server described herein.

In a first step 202, a questionnaire may be generated on each user device. A system server may generate a software-based compliance evaluation tool. The software-based compliance evaluation tool may be a software-based compliance evaluation application. The system server may install the software-based compliance evaluation application on each user device of each user. In one embodiment, the software-based compliance evaluation application may be installed on an operating system of each user device. In another embodiment, the software-based compliance evaluation application may be installed on a browser application of each user device. In yet another embodiment, the software-based compliance evaluation application may be displayed on a user interface of each user device as a pop-up window, a new window, or in any visually perceptible format.

The system server may receive a plurality of questionnaires associated with a plurality of software programs or software products from an admin computer. The admin computer may generate each questionnaire associated with each software program. Each questionnaire may be associated with a hierarchy file. The hierarchy file may be a software file, which may contain a structure for respective paths and sequences of user interfaces for presentation on each user device receiving the questionnaire and dynamically adjusts the questionnaire based upon input from each user device.

The system server may present the plurality of questionnaires on the user devices via the software-based compliance evaluation application running on each user device. The system server may modify the questionnaires to include some question sections in the questionnaires regarding operation of a computer environment associated with the user devices. The system server may further modify the questionnaires to include some question sections in the questionnaires regarding operation of one or more processors and software systems associated with a user identifier of each user device.

When a first user device uses the software-based compliance evaluation application running on its operating system to select a first questionnaire corresponding to a first software program, the system server may install and execute a first hierarchy file associated with the first questionnaire on the first user device. After the installation of the hierarchy file, the system server may present the first questionnaire on a first graphical user interface of the first user device via the software-based compliance evaluation application. The first questionnaire may include multiple questions. Initially, a first question is presented on the first graphical user interface of the first user device via the software-based compliance evaluation application. On receiving a first input in response to the first question, the system server may present a second question on a new graphical user interface of the first user device via the software-based compliance evaluation application. The second question is automatically selected based on the evaluation of the first input with respect to the first hierarchy file.

In a next step 204, scoring algorithms may be executed to score each input from each questionnaire presented on each user device. The system server may continually parse data associated with inputs submitted in each questionnaire presented on each user device via the software-based compliance evaluation application. Consequently, the system server may retrieve all inputs from each questionnaire presented on each user device. The system server may store all inputs in a system database. Each input may be associated with an attribute of a software program. The attribute may be a particular feature of the software program. For instance, each software program may include a set of modules, and a first attribute of the software program may correspond a first module of the software program. The first module may be associated with a first application of the software program.

The system server may execute a scoring model to score each input from each questionnaire presented on each user device. The scoring model may be a software model. The software model may be a non-linear statistical data model. The non-linear statistical data model may include a neural network, a decision tree, or a Bayesian network.

The system server may execute one or more scoring algorithms to score each input from each questionnaire presented on each user device. The scoring algorithm retrieves underlining information and attributes associated with each input from a database. The scoring algorithm may process the underlining information and attributes associated with each input and computes a score for each input. The weighting of various parts of the underlining information used in the performance of the scoring algorithm may be reviewed and updated regularly. The system server may store the score for each input in the database.

The system server may adjust the score for each input according to priority weight for each part of the underlining information of each input. The system server may determine the priority weight for each part of the underlining information of each input based on a type and nature of a potential compliance problem associated with each part of the underlining information of each input. The system server may store different types of information based on a priority weight into dedicated databases or sub-databases of the system database where each sub-database is configured to store a certain type of information.

In a next step 206, a request may be generated based on the score associated with each input. The system server may execute a request application. The server computer may generate and implement instructions on the request application to generate a request based on a score associated with each input from the questionnaire for each software program. The request may be a verification request.

Initially, the server computer may compare the score associated with each input from the questionnaire for each software program with a predetermined threshold value. The system server may select all such inputs whose score does not satisfy the predetermined threshold value. The system server may generate a request for verification of each selected input. Each request corresponding to each input may include an alert. The alert may include a set of potential compliance problems associated with information within the input. The alert may be a log file or other machine-readable code containing various data fields describing a detected set of potential compliance problems.

In one non-limiting example, the system server may generate a first request based on a first input. The first request may include a first alert. The first alert may include information associated with a first attribute of a first software program. The first alert may also include a set of first potential compliance problems associated with the first attribute of the first software program. The system server may further generate a second request based on a second input. The second request may include a second alert. The second alert may include information associated with a second attribute of a second software program. The second alert may also include a set of second potential compliance problems associated with the second attribute of the second software program. The system server may store records of the first request and the second request in the system database.

The system server may assign a priority score to each request. The system server may execute a priority scoring model to determine the priority score for each request. The priority scoring model may be a non-linear statistical data model, which may calculate the priority score for each request. The non-linear statistical data model may include a neural network model, a decision tree model, or a Bayesian network model. The system server may store each request based on their priority score into dedicated databases or sub-databases of the system database where each sub-database is configured to store the requests having a certain priority score.

In a next step 208, different requests may be routed to appropriate analyst computers. The system server may route the requests to analyst computers. The system server may route the requests to the analyst computers based on the priority score of each request. The system server may route the requests to the analyst computers based on credentials of analysts operating the analyst computers.

Each analyst computer may receive the requests that are related to a subject matter (e.g., a type of request) and a procedural role (e.g., a time-sensitive request). Each analyst computer may receive each request having the subject matter or procedural data fields associated with the analyst credentials and with rights to access the sub-database containing additional information about the request. For instance, the analyst credentials of the analyst specializing in the time sensitive requests may indicate to the system server to present the analyst with the request having a data field indicating that the particular request is time sensitive.

In one non-limiting example, the system server may route the first request to a first analyst computer configured to perform a first verification on the first request. The first request may be associated with a first technical field, and a first analyst operating the first analyst computer may have credentials indicating specialization in the first technical field. The first analyst computer may process the first request. Based on the processing, the first analyst computer may tag the first request. The tag may indicate whether the first request has been resolved or not based on the first verification. The system server may further route the second request to a second analyst computer configured to perform a second verification on the second request. The second request may be a time-sensitive request, and a second analyst operating the second analyst computer may be instantly available for verification of any request. The second analyst computer may process the second request. Based on the processing, the second analyst computer may tag the second request. The tag may indicate whether the second request has been resolved or not based on the second verification.

The system server may trigger and transmit a notification to each analyst computer having the analyst credentials with characteristics indicating a role of the analyst. For instance, the analyst may have the analyst credentials with the characteristics, which may indicate that the analyst specializes in handling the time-sensitive requests. When a new prioritized request is generated or an existing request is updated with a data field indicating that the new prioritized request is time sensitive, the system server may transmit the notification message to the analyst computer regarding a verification of the new prioritized request. The analyst computer may then retrieve the new prioritized request from the system database.

The system server may generate a queue model, which may include queues. The system server may store each queue in the system database. Each queue may include one or more requests. Each queue may be associated with at least analyst computer. The system server may populate each queue based on a priority score of the requests. The system server may also populate each queue based on the subject matter of the requests. The analyst computer may also be to populate the queues with the requests received from the system server.

Figure 5:
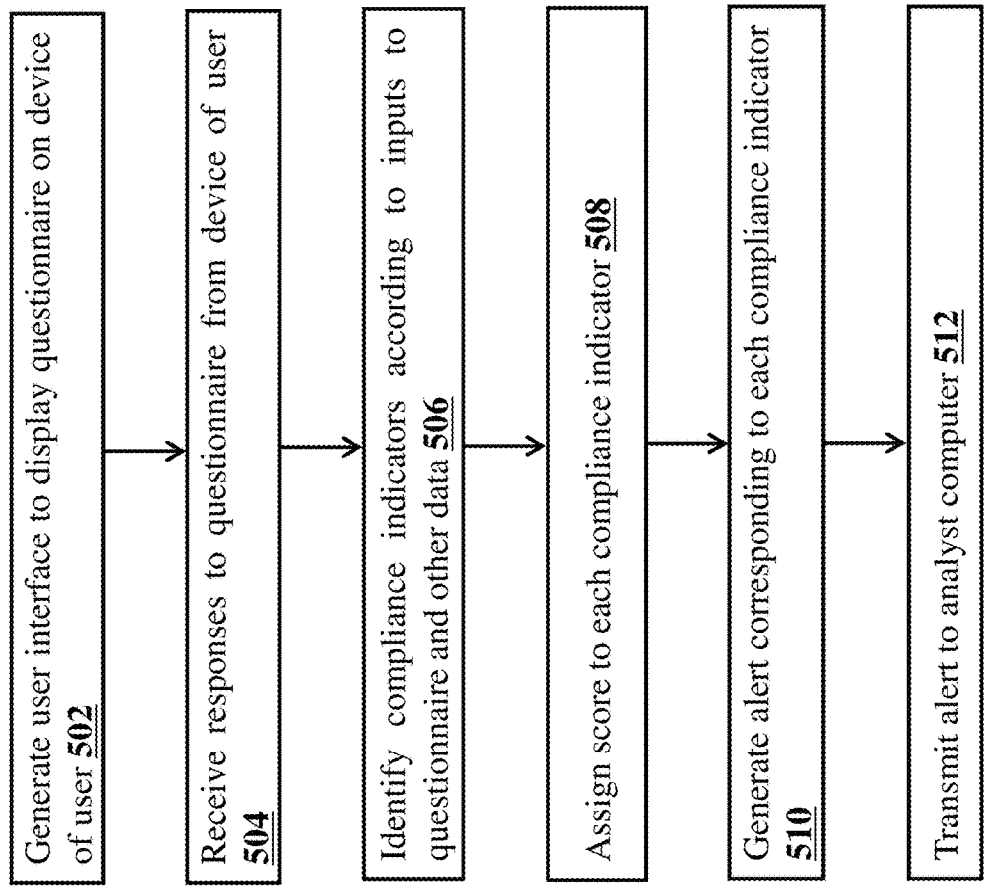
FIG. 5 shows execution of a method for evaluating software programs, according to an embodiment.

FIG. 5 shows execution steps of a method 500 for evaluating software programs.

The method 500 shown in FIG. 5 comprises execution steps 502, 504, 506, 508, 510, and 512. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 500 of FIG. 5 is described as being executed by a single server computer, referred to as a system server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the system server described herein.

In a first step 502, a user interface may be generated to display a questionnaire on a device of a user. A system server may generate a software-based compliance evaluation tool (for example, a software-based compliance evaluation application) and install the tool on a user device of a user. In one example, the software-based compliance evaluation tool may be installed on an operating system of the user computing device. In another example, the software-based compliance evaluation tool may be installed on a browser application of the user device. In yet another example, the software-based compliance evaluation tool may be displayed on a display of the user device as a pop-up window, a new window, or in any visually perceptible format.

The system server may be configured to generate a graphical user interface, which is configured to be displayed on the user device of a user. The system server may be further configured to generate a questionnaire regarding software processes, systems, and operations of the user (for example, a vendor). The system server may be further configured to generate the questionnaire regarding operation of a computer environment associated with the user device. The system server may be further configured to generate the questionnaire regarding operation of one or more processors and software systems associated with the user device. The questionnaire may include a set of questions per information compliance indicator including questions related to each compliance component associated with the processes, the systems, and the operations corresponding to the user. The questionnaire may include present questions based on a tree structure, which may include various branches defining respective paths and sequences of screens to a specific screen to be presented to the user on the software-based compliance evaluation application depending on how the user responds to certain questions presented within prior or current screens on the software-based compliance evaluation application.

In a next step 504, responses to the questionnaire may be received from the device of the user. Upon the user executing a browser to access and launch online software-based compliance evaluation application executing on the user device to prepare a compliance evaluation form, a questionnaire is then displayed on the software-based compliance evaluation application. The user then navigates screens of the software-based compliance evaluation application and enters data in response to the questions presented on the screens. The system server may receive one or more electronic inputs corresponding to questions within the questionnaire from the user device of the user. The user of the user device may provide the one or more electronic inputs corresponding to each question within the questionnaire by interacting with the software-based compliance evaluation application via an input device, such as a touch screen, a mouse, a keyboard, a keypad, and others.

Upon displaying the questionnaire on the software-based compliance evaluation application on the user device of the user, the system server may then receive one or more electronic inputs corresponding to each question within the questionnaire from querying a database associated with the user device.

In a next step 506, compliance indicators may be identified according to inputs to the questionnaire and other data. Upon displaying the questionnaire on the software-based compliance evaluation application on the user device of the user, the system server may on its own determine a status of one or more compliance attributes/indicators/factors (risk attributes/indicators/factors) associated with the inputs to the questions in the questionnaire. For example, the system server may install an executable file on the user device, and the executable file may scan an operating system and a hardware system of the user device, and transmit scanning results from the software-based compliance evaluation application on the user device to the server computer. The system server may analyze the scanning results to identify the compliance attributes/indicators/factors and their compliance status associated with the input answers to the questionnaire.

In another example, the system server may install a software module on the user device, and the software module may monitor activities on the software-based compliance evaluation application by monitoring the operations of an operating system and a hardware system of the user device, and then transmit the operation results to the server computer. The system server may analyze the results to identify the compliance attributes/indicators/factors and their compliance status associated with the inputs answers to the questionnaire.

The system server may continually parse data of the inputs to the questions in the questionnaire and/or the software-based compliance evaluation application being accessed by the user on the user device to detect any keywords that correspond to known terms associated with a detection of a compliance factor/indicator. The system server may determine the compliance indicator/factor during the activity of the user on the user device by using keyword searches and/or character searches on the software-based compliance evaluation application being operated by the user to find one or more of a plurality of keywords or characters that are pre-determined and known compliance indicator/factor related keywords. The system server may record information details of the compliance indicator/factor on the user device of the user and store the information details of the compliance indicator/factor in a record within the system database.

In a next step 508, a score may be assigned to each compliance indicator. The system server may process compliance data/information associated with each compliance indicator/factor to determine a score (such as a compliance score) corresponding to each compliance indicator/factor, and then generate high-priority compliance indicators/factors (or alerts corresponding to the compliance indicators/factors) upon determining that the compliance score corresponding to the compliance indicator/factor satisfies a pre-defined threshold score. The system server may determine the compliance score corresponding to the compliance indicator/factor based on a compliance model that the server computer applies to the captured compliance data/information and other data. The system server may determine a compliance score for each compliance indicator/factor based on the compliance model and/or algorithm such as a non-linear statistical data model that calculates the compliance score associated with each compliance indicator/factor. The non-linear statistical data models may include neural networks, decision trees, Bayesian networks, genetic algorithms, or other types of non-linear statistical data models. The system server may determine the compliance score for each compliance indicator/factor using the compliance model based at least on a behavior profile of the user associated with each compliance indicator/factor. The compliance model may use algorithms and computational methods that allows the server computer to discover patterns in the captured compliance data/information associated with the compliance indicator/factor and/or behavior profile of the user associated to each compliance indicator/factor.

The system server may first generate an initial compliance score for each compliance indicator/factor. The system server may generate the initial compliance score for each compliance indicator/factor based on incoming compliance data/information that are associated with a user identifier of the user. Based on the data fields associated with the compliance data/information, the system server may determine the initial compliance score based on an algorithm that is applicable to data fields of a particular compliance related problem underlying the compliance data/information. The system server may adjust the initial compliance score or each compliance indicator/factor according to priority weight for each compliance indicator/factor. The system server may determine the priority weight for each compliance indicator/factor based on a type and nature of compliance related problem underlying the compliance data/information. The system server may store the compliance indicators/factors based on the priority weight into dedicated databases or sub-databases of the system database where each sub-database is configured to store the compliance indicators/factors with certain types of priorities. The compliance indicators/factors may be stored based on their priority into a sub-database of the system database and sorted according to the relative compliance score within the sub-database of the system database.

In a next step 510, an alert corresponding to each compliance indicator may be generated. Upon determination of compliance indicators/factors by a server computer, the system server may execute an alert application icon on the user-computing device and/or on the system server. In response to the execution of the alert application icon, an alert application may be displayed on a graphical user interface/display of the user-computing device and/or the server computer. The alert application may be displayed on the user-computing device and/or the server computer as a pop-up window, a new window, or any other visually perceptible format. The alert application window may be a pop-up window that appears in front of a current browser window of the user-computing device and/or the server computer where a compliance indicator/factor is detected or user was working upon the software-based compliance evaluation application.

The system server may generate and execute instructions to generate an alert and/or a notification for each determined compliance indicator/factor. The execution of the instructions may trigger one or more modules to generate the alerts for each determined compliance indicator/factor. The alerts may correspond to a set of compliance indicators/factors such as software installation and/or operation problems. The alerts may be log files or machine-readable code containing various data fields describing a detected compliance indicator/attribute within the compliance information/data. The compliance information/data corresponding to the compliance indicator/attribute may include data obtained from input responses to questions in questionnaire displayed on the software-based compliance evaluation application of the user device.

The system server may transmit the alerts and/or the notifications to a system database. The system server may process the compliance information/data associated with the alerts and/or the notifications to determine a compliance score corresponding to each alert, and then generate high-priority alerts upon determining that the compliance score corresponding to the alert satisfies a pre-defined threshold score. The system server may determine an alert probability corresponding to each alert based on an alert-generation model that the server computer applies to data associated to each alert. The system server may determine the alert probability score for the alert based on the alert-generation model and/or algorithm, such as a non-linear statistical data model that calculates the alert probability score associated with each alert. The non-linear statistical data models may include neural networks, decision trees, Bayesian networks, genetic algorithms, or other types of non-linear statistical data models.

The system server may determine a priority weight for each alert based on the alert probability score associated with each alert. The system server may store the alerts based on the priority weight into dedicated databases or sub-databases of the system database where each sub-database is configured to store the alerts with certain types of priorities. The alert may be stored based on their priority into a sub-database of the system database and sorted according to the relative compliance score within the sub-database of the system database.

In a next step 512, an alert may be transmitted to an analyst computer. The system server may transmit the alerts and/or the notifications to an analyst computer. The system server may transmit the alerts to the analyst computer based on their priority weight. The analyst computer GUI may receive the alerts (for example, the prioritized alerts based on their priority weight) that are related to subject matter (e.g., type of alert) and/or procedural role (e.g., time-sensitive alert) of the respective analyst. In some embodiments, based on the compliance data field associated with the alert, the analyst computer may receive the prioritized alerts having subject matter or procedural compliance data fields associated with analyst credentials with rights to access the sub-database containing the prioritized alerts. For instance, the analyst credentials of an analyst specializing in time sensitive alerts would indicate to the analyst computer that the analyst computer should retrieve and present an alert having a compliance data field indicating that the particular alert is time sensitive.

The system server may trigger and transmit a notification to each analyst computer having analyst credentials with access attributes indicating a role of the analyst. For instance, an analyst may have analyst credentials with attributes that indicate that analyst specializes in handling time-sensitive prioritized alerts. When a new prioritized alert is generated or an existing alert is updated with a compliance data field indicating that the prioritized alert is time sensitive, the server computer may transmit a notification message to the analyst computer regarding the new alert.

The system server may generate a queue model that contains queues. Each of the queues may contain one or more alerts or prioritized alerts. The system server may populate the queues based on alert probability score and/or priority weight of the alerts. In addition, an analyst, in response to inquiry from the user or the server computer, may also be to populate the queues. In an alternative embodiment, a separate system may be designed to manage compliance related inquiries from the user that can populate the queues with the prioritized alerts. In this alternative embodiment, investigation of a compliance factor related inquiry can lead to a discovery of potentially priority activity, and, in turn, automatically create prioritized alerts for population in the queues.

Figure 6:
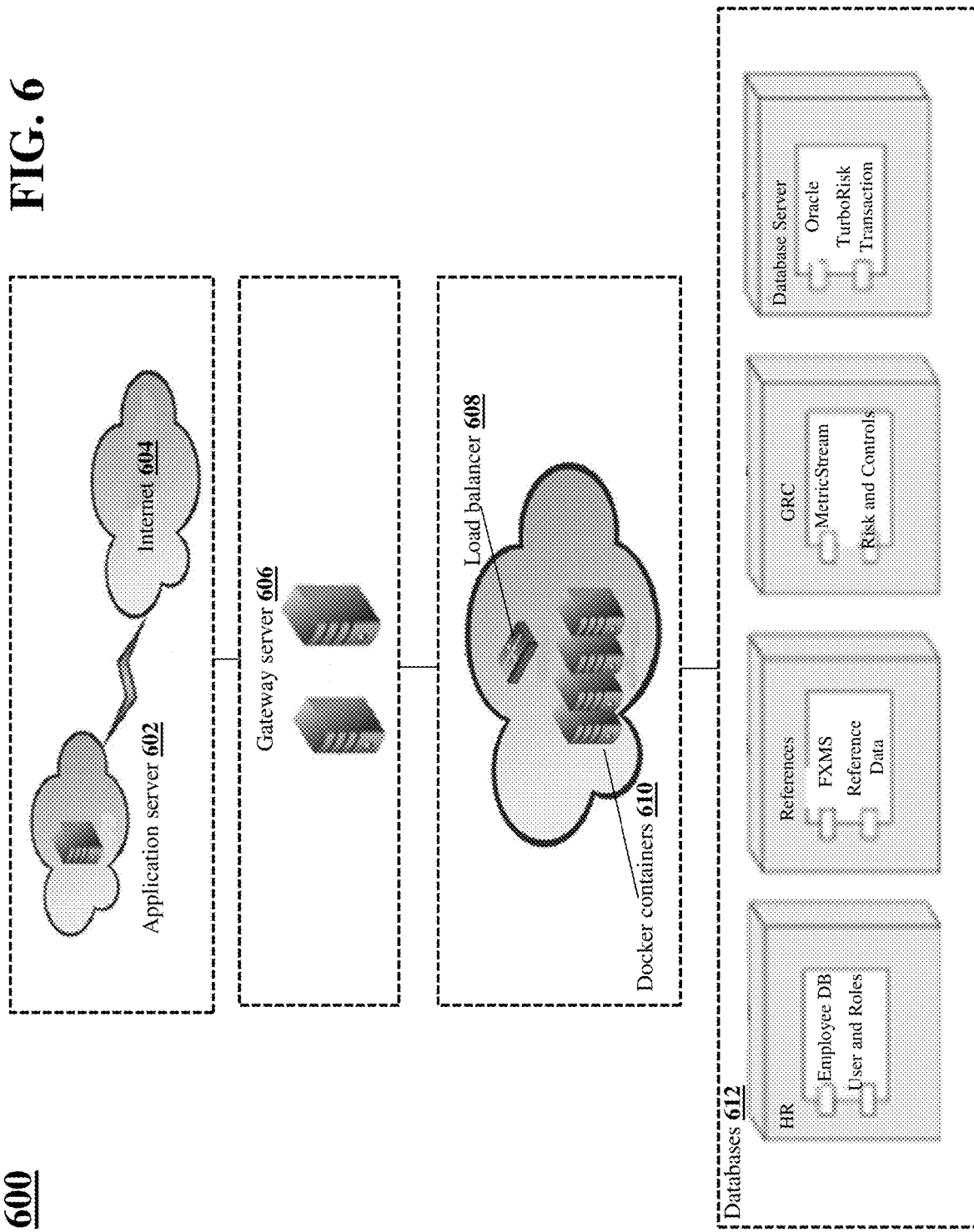
FIG. 6 shows a governance, risk, and compliance (GRC) application system for evaluating software programs, according to an embodiment.

FIG. 6 shows a GRC application system 600 configured for evaluating software programs. The GRC application system 600 may include an application server 602, a gateway server 606, a load balancer 608, docker containers 610, and databases 612. The application server 602, the gateway server 606, the load balancer 608, the docker containers 610, and the databases 612 may communicate with each other over Internet 604. The GRC application system 600 is a non-limiting example of a computer system architecture for implementing the methods and systems described herein.

The application server 602 may be a computing device comprising a processor and non-transitory machine-readable storage medium. The application server 602 may be capable of performing various tasks and processes described herein. Non-limiting examples of the application server 602 may include a desktop computer, a server computer, a laptop computer, a tablet computer, or the like. The application server 602 may implement (e.g., execute) a software-based compliance evaluation tool (for example, a TurboRisk application) for accurate notation, capture, and reporting of all potential compliance problems within a technical, a procedural or a process domain associated with a software program.

The gateway server 606 may be a computing device comprising a processor and non-transitory machine-readable storage medium. The gateway server 606 may be capable of performing various tasks and processes described herein. Non-limiting examples of the gateway server 606 may include a desktop computer, a server computer, a laptop computer, a tablet computer, and the like. The gateway server 606 may enable a rapid and pro-active response to reported potential compliance problems determined by the application server 602. The gateway server 606 may route a request associated with each reported potential compliance problem to an appropriate analyst computer.

The load balancer 608 may be a computing device comprising a processor and non-transitory machine-readable storage medium. The load balancer 608 may be capable of performing various tasks and processes described herein. For instance, the load balancer 608 may distribute network or application traffic across a number of servers, such as the application server 602. The load balancer 608 may also distribute request traffic across a number of computers, such as the analyst computers. The load balancer 608 may store network or application traffic information in the docker containers 610. The load balancer 608 may also store the request traffic information in the docker containers 610. In some configurations, the gateway server 606, load balancer 608, and docker container 610 may be different components and modules of the application server 602.

The databases 612 may be in communication with processors of the application server 602, the gateway server 606, the load balancer 608, and the docker containers 610 where the processors may be capable of executing various commands of the GRC application system 600. The databases 612 may be part of the application server 602, the gateway server 606, the load balancer 608, or the docker containers 610. The databases 612 may be a separate component in communication with the application server 602, the gateway server 606, the load balancer 608, and the docker containers 610. The databases 612 may store data records associated with various aspects of application services offered to users. The databases 612 may be capable of storing the data records in a plain format or an encrypted version. Non-limiting examples of the data records may include HR employee information, reference data, and transaction data.

Figure 7:
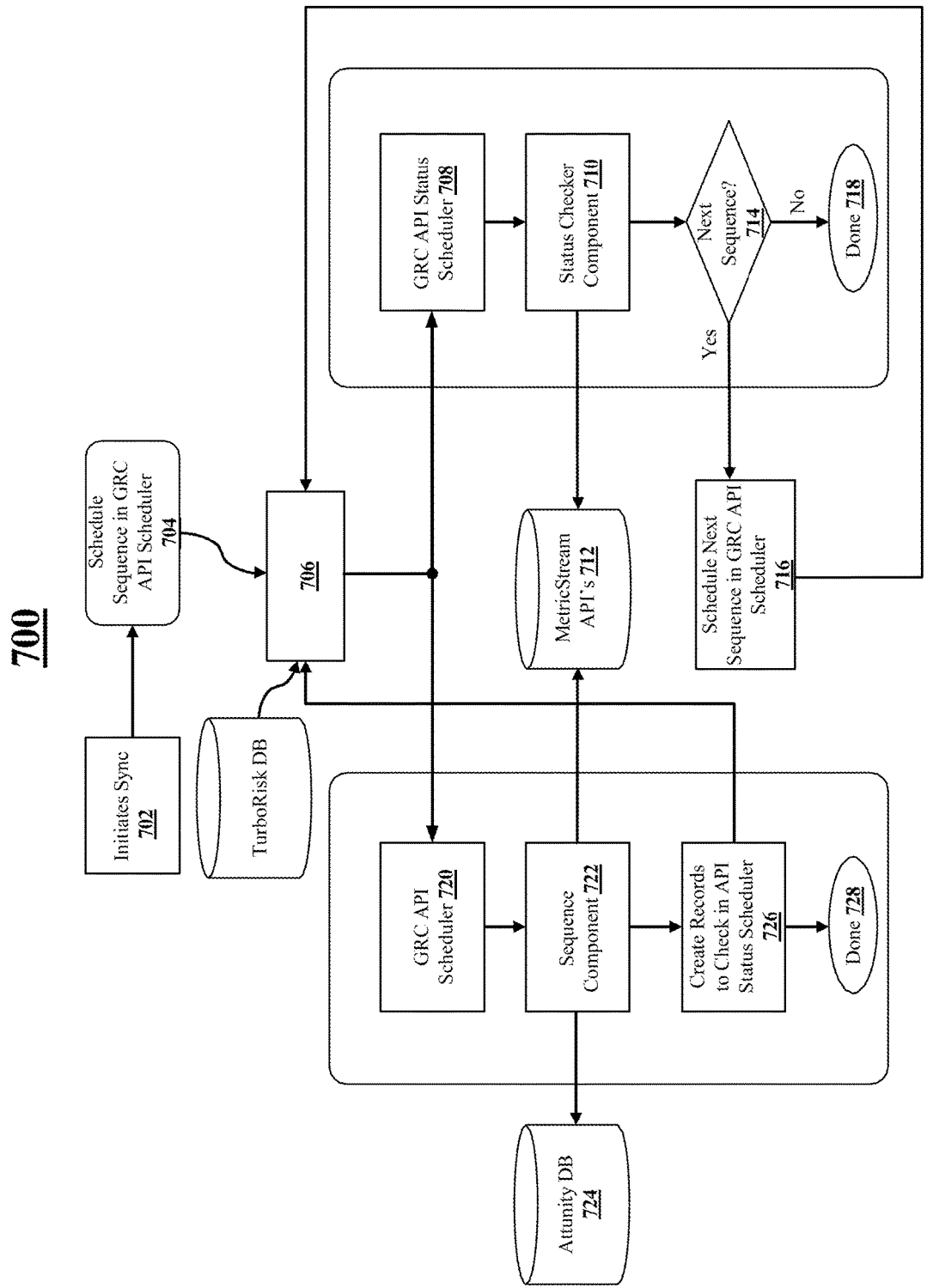
FIG. 7 shows a method for execution of a sync scheduler, according to an embodiment.

FIG. 7 shows execution steps of a method 700 where a sync scheduler is implemented via a system server for populating multiple databases with data. The data may include inputs received from user device for each questionnaire. The data may further include score inputs, compliance indicators, and alerts. Therefore, the data may include all data generated as a results of execution of the methods and systems described herein. For instance, the data may include all responses to various questionnaires displayed on different user electronic devices. In some embodiments, a central server (such as the system server described in FIG. 1) may synchronously or asynchronously populate a separate database with the above described data. As a result, the central server may generate various reports and perform analytical protocols on the data without interrupting a data flow of an organization. The multiple databases may include TurboRisk database and MetricStream database (not shown). The multiple databases may further include an Attunity database 724, which is replicated in accordance with data within the MetricStream database.

The method 700 begins at step 702 where the system server may initiate and execute a sync instruction. The sync instruction may include commands for populating the MetricStream database with the generated data. At step 704, the system server may generate and execute a schedule instruction for scheduling sequence in a GRC API scheduler. The system server may schedule a synchronization where data stored within various databases are synchronized. The schedule instruction may include information associated with a first sequence of the data, which has to be transmitted to the MetricStream database. The schedule instruction may further include the information associated with a time of transmission of the first sequence of the data to the Metric- Stream database. The schedule instruction may further include the information associated with a quantity of the data, which have to be transmitted to the MetricStream database. At step 706, the system server may select the data from the TurboRisk database, which has to be transmitted to the MetricStream database based on the information associated with the schedule instruction. The TurboRisk database may store all data received from the user device and other server computing devices.

At step 708, the system server may generate and execute a status instruction, which may result in verification of status of all scheduling sequences in a GRC API status scheduler. The system server may determine a current status of the first sequence of the data, which has to be transmitted to the MetricStream database. As used herein, a sequence of data may refer to a batch of data generated as a result of executing the GRC application or any other method described herein. The data generated may be parsed and segmented in accordance to various attributes (e.g., time of data generation and volume of data). At step 710, a status checker component via the system server may initiate transmission of the first sequence of the data selected from the TurboRisk database to the MetricStream database. The status checker may initiate the transmission at a particular date and time, which is included in the schedule instruction.

At step 712, the MetricStream database may receive the data via the system server's API. The MetricStream database may store all received data. At step 714, the system server may generate and execute an inquiry to determine whether any additional data has to be transmitted to the MetricStream database. At step 716, when the system server determines that additional data has to be transmitted to the MetricStream database, the system server may generate and execute a new schedule instruction for scheduling sequence in the GRC API status scheduler. The new schedule instruction may include information associated with a second sequence of the data to be transmitted to the MetricStream database. The new schedule instruction may further include the information associated with a time of transmission of the second sequence of the data to the MetricStream database. The new schedule instruction may further include the information associated with the quantity of the data to be transmitted to the MetricStream database. At step 718, when the system server may determine that no additional data has to be transmitted to the MetricStream database, the system server may end this process.

At step 720, the system server may also generate and execute an instruction, which may result in verification of status of all scheduling sequences in the GRC API scheduler. Based on the verification, the system server may determine the current status of the first sequence of the data, which has to be transmitted to the MetricStream database. At step 722, a sequence component via the system server may initiate transmission of the first sequence of the data selected from the TurboRisk database to the MetricStream database. At the same time, the sequence component via the system server may also initiate the transmission of the first sequence of the data selected from the TurboRisk database to the Attunity database. At step 724, the Attunity database may receive the data via the system server (e.g., synchronous replication). At step 726, the system server may create inquiry records in the GRC API status scheduler to determine if a next sequence of the data has to be transmitted to the MetricStream database. At step 728, when the system server may determine that no additional data has to be transmitted to the MetricStream database, the system server may end this process.

Figure 8:
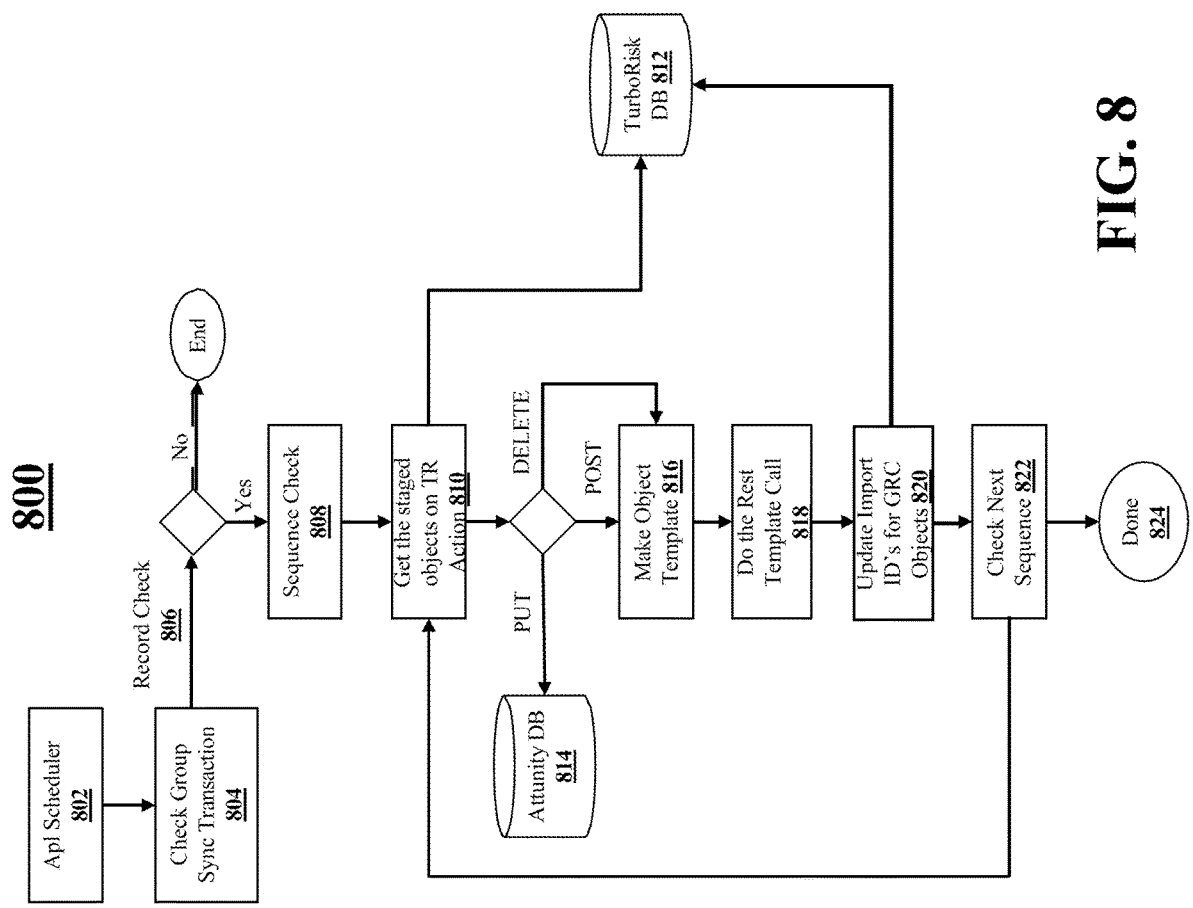
FIG. 8 shows a method for execution of GRC application programming interface (API) scheduler, according to an embodiment.

FIG. 8 shows execution steps of a method 800 where a GRC API scheduler is implemented via a system server. The method 800 begins at step 802 where the system server may initiate and execute an instruction for execution of the GRC API scheduler. The GRC API scheduler may store at least one schedule instruction. The schedule instruction may include information associated with a sequence of data objects, which has to be transmitted to an Attunity database. The schedule instruction may further include the information associated with a time of transmission of the sequence of the data objects to the Attunity database. The schedule instruction may further include the information associated with a quantity of the data objects, which have to be transmitted to the Attunity database.

At step 804, the system server may generate and execute an instruction for checking group sync transaction. At step 806, the system server may perform a record check for a list of all scheduling sequences in a database. When there is no record of any scheduling sequences within the database, the system server may end this process. When the system server determines a presence of the record of the scheduling sequences in the database, at step 808, the system server may generate and execute instructions to perform a sequence check of pending schedule instructions associated with the scheduling sequences.

At step 810, the system server may generate and execute an instruction to receive data objects from a TurboRisk database associated with the at least one schedule instruction. For instance, a server may directly communicate with a server hosting the turbo risk TurboRisk database to receive data generated as a result of execution of the GRC program. At step 812, the system server may extract the data objects from the TurboRisk database. At step 814, the system server may (e.g., "PUT") transmit and store the data objects in the Attunity database. At step 816, the system server may (e.g., "DELETE" OR "POST") generate an object template for each data object received from the TurboRisk database.

At step 818, the system server may generate and execute an instruction for a template call of each object template. At step 820, the system server may update import ID for each data object in the database based on the template call. At step 822, the system server may generate and execute an instruction to check for a next sequence of data objects, which has to be transmitted to a metricstream database. At step 824, the system server may end this process when no additional data objects have to be transmitted. By generating template objects, the system server may establish an API where the API can automatically receive new data generated and stored within the TurboRisk database. The API will then identify whether the new data must be deleted or replicated within the Attunity database.

Figure 9:
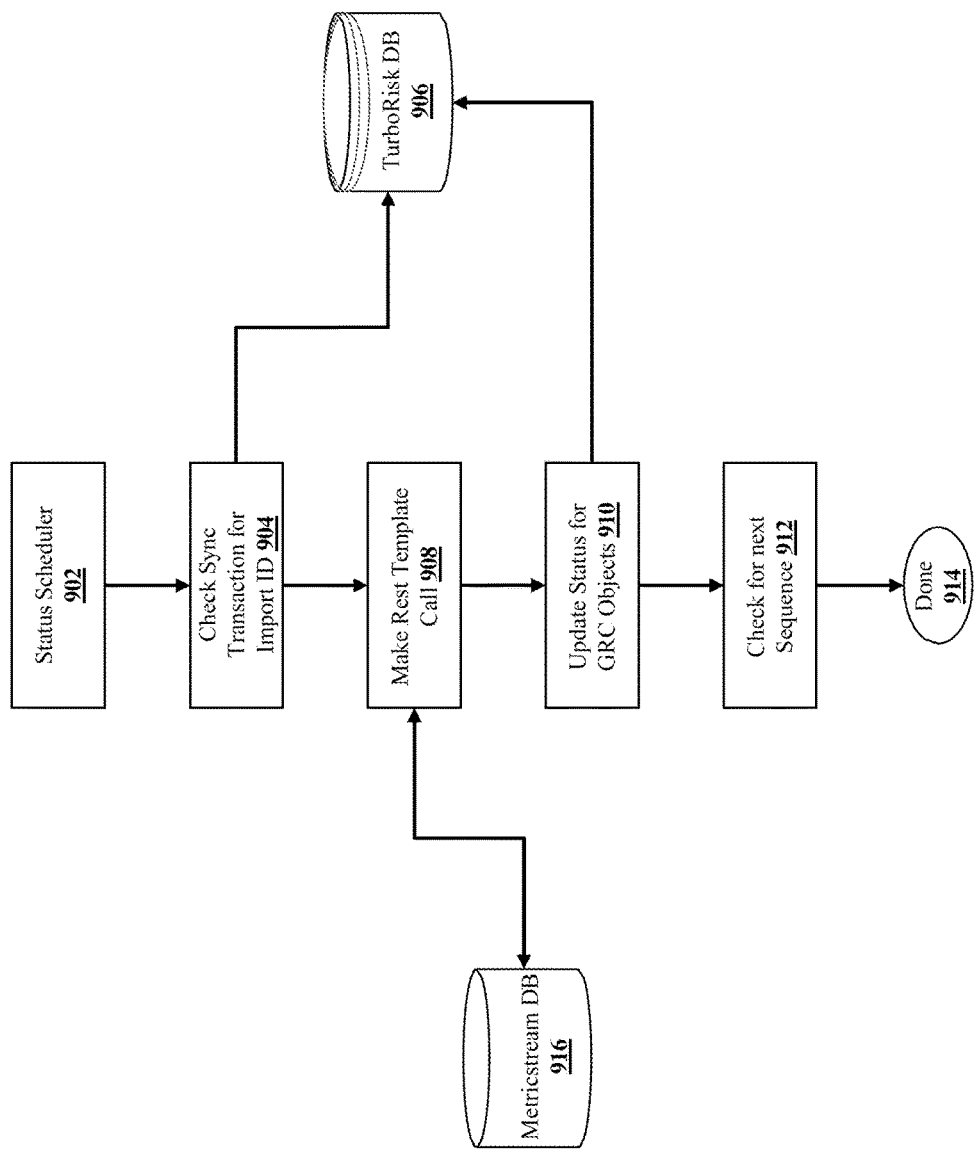
FIG. 9 shows a method for execution of GRC API status scheduler, according to an embodiment.

FIG. 9 shows execution steps of a method 900 where a GRC API status scheduler is implemented via a system server. The method 900 begins at step 902 where the system server may initiate and execute an instruction for execution of the GRC API status scheduler. The GRC API status scheduler may store at least one schedule instruction. The schedule instruction may include information associated with a sequence of data objects, which has to be transmitted to a MetricStream database. The schedule instruction may further include the information associated with a time of transmission of the sequence of the data objects to the MetricStream database. The schedule instruction may further include the information associated with a quantity of the data objects, which have to be transmitted to the MetricStream database.

At step 904, the system server may generate and execute an instruction for checking transaction for import ID of each data object, which has to be transmitted to the MetricStream database 916. For instance, the system server may crawl the TurboRisk database to identify data consistent with the import ID (e.g., consistent with the information within the status scheduler). At step 906, the system server may extract the data objects from the TurboRisk database, which have to be transmitted to the MetricStream database using the import ID of data objects. At step 908, the system server may generate and execute an instruction for a template call of each object template associated with each data object, which have to be transmitted to the MetricStream database (e.g., step 916). The system server may transmit and store the data objects in the MetricStream database. At step 910, the system server may update status of each data object. At step 912, the system server may generate and execute an instruction to check for a next sequence of data objects, which has to be transmitted to a MetricStream database. At step 914, the system server may end this process when no additional data objects have to be transmitted.

Using the methods 700, 800, and/or 900, the system server can automatically replicate the data into the MetricStream database without interfering with the operations of the TurboRisk database. In this way, the system server can execute various analytical protocols on the data replicated into the MetricStream database without burdening the TurboRisk database.

FIGS. 10A-10I show a graphical user interface 1000 displaying a software-based compliance evaluation application launched on a user device. The user device may be a desktop computer of a user, such as a vendor employee. The user device may include a processor, which may perform one or more operations according to one or more programming instructions. The user device may be capable of communicating with a system server using wired or wireless communication capabilities.

The user may install the software-based compliance evaluation application on the user device or use as a user-centric website. A webserver may generate the software-based compliance evaluation application as a widget to communicate with the user. The user may use the software-based compliance evaluation application to evaluate a software program.

The webserver may require user authentication based upon a set of user authorization credentials (e.g., username, password, biometrics, cryptographic certificate) to provide access to the software-based compliance evaluation application on the user device. For example, the user device may access a local memory configured to store the user credentials, which the webserver may reference in order to determine whether a set of entered credentials purportedly authenticating the user match an appropriate set of credentials that identify and authenticate the user. Similarly, in some implementations, the webserver may generate and serve the webpages associated with the software-based compliance evaluation application on the user device based upon a user profile account. The webserver may generate and serve the webpages associated with the software-based compliance evaluation application on the user device based upon a membership of the user. The user profile may include data fields in a user record stored in the local memory.

The user may access the software-based compliance evaluation application by a common access method, e.g., keying in a URL, selecting from search results, etc., and submit user credentials to access the software-based compliance evaluation application on the user device. Upon the system server authenticating the user using credentials that identify the user as a valid member, the software-based compliance evaluation application is presented on the user device. The user may interact with various features of the software-based compliance evaluation application.

Figure 10A:
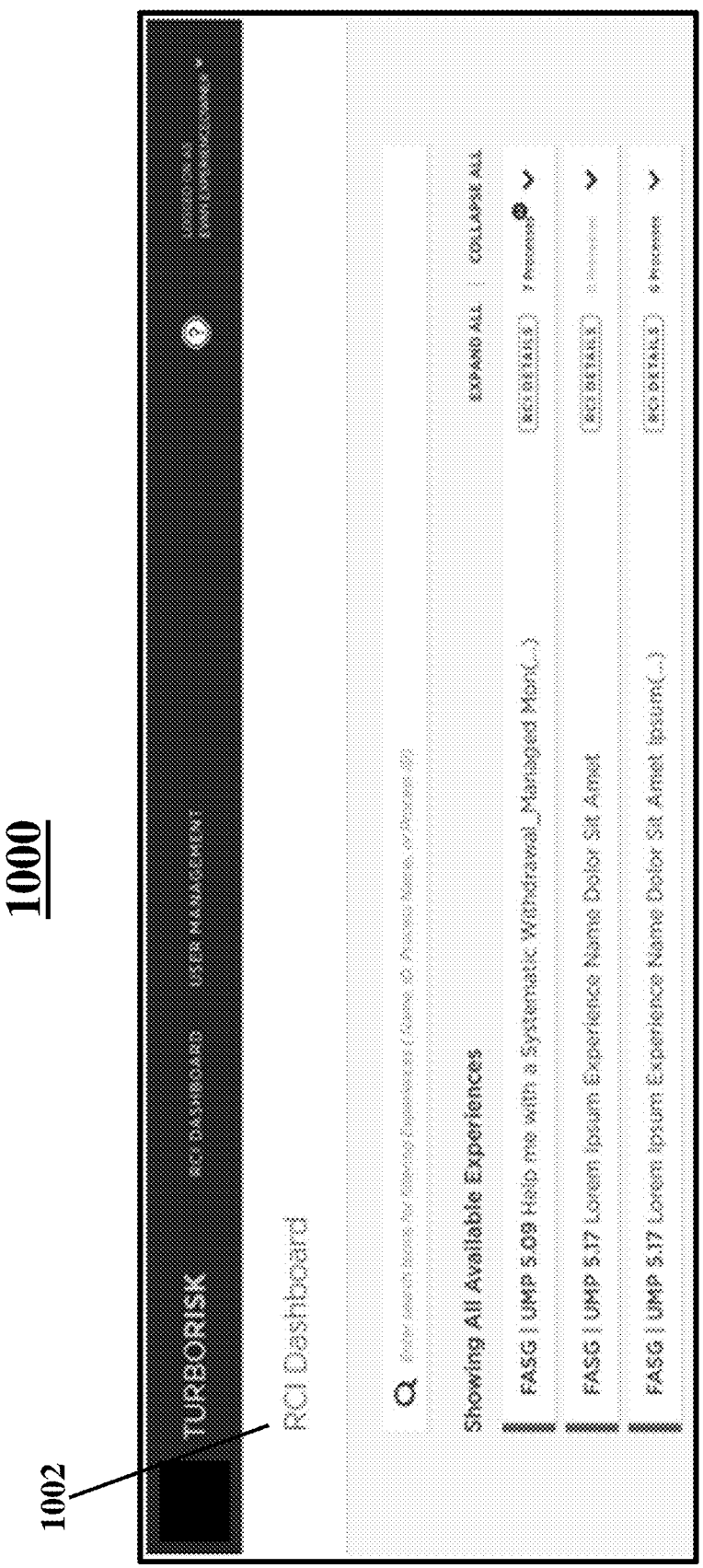
FIG. 10A shows a graphical user interface displaying all available experiences on a software-based compliance evaluation application launched on a user device, according to an embodiment.
Figure 10B:
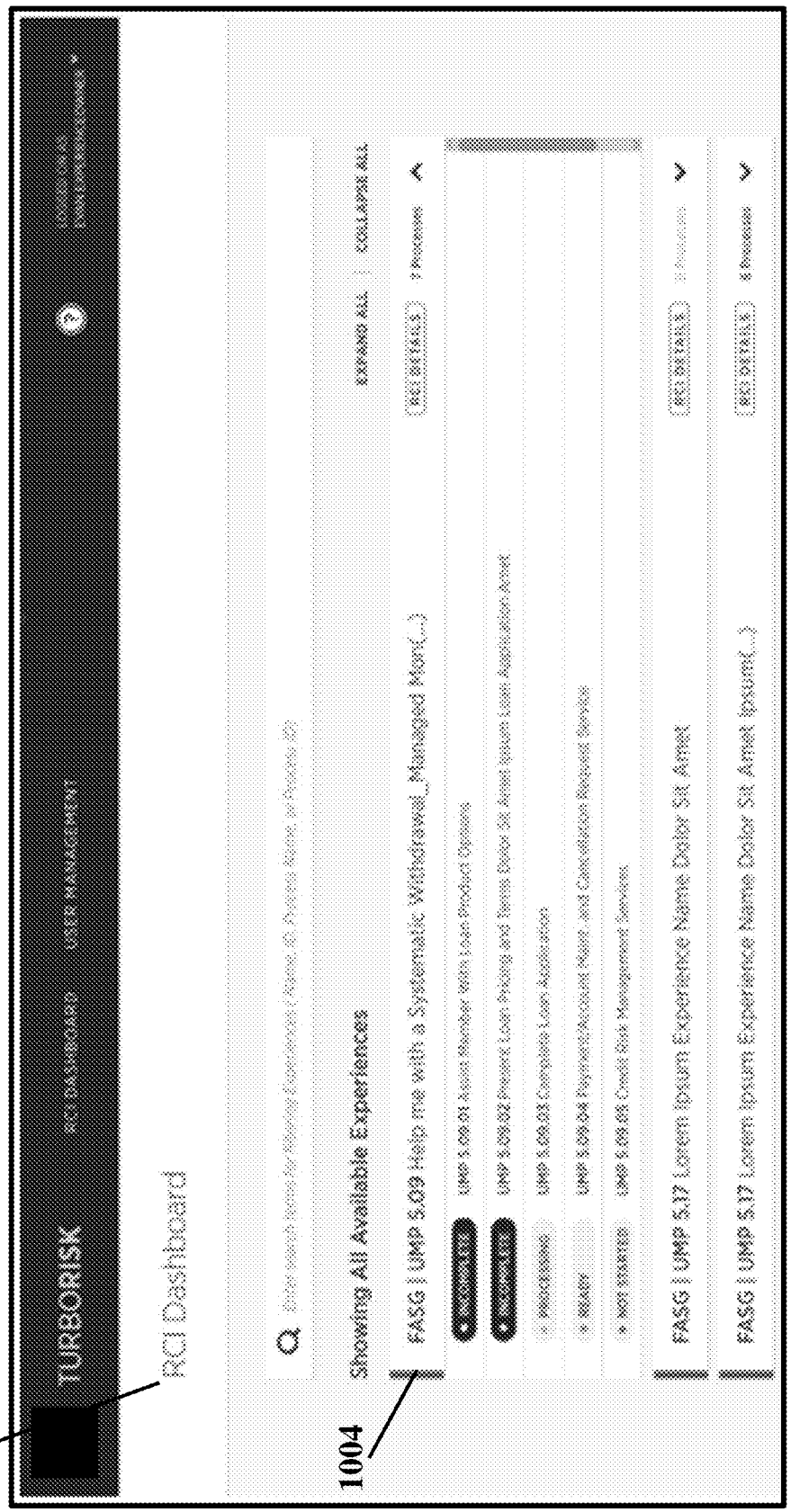
FIG. 10B shows a graphical user interface displaying a status of all available experiences on a software-based compliance evaluation application launched on a user device, according to an embodiment.
Figure 10C:
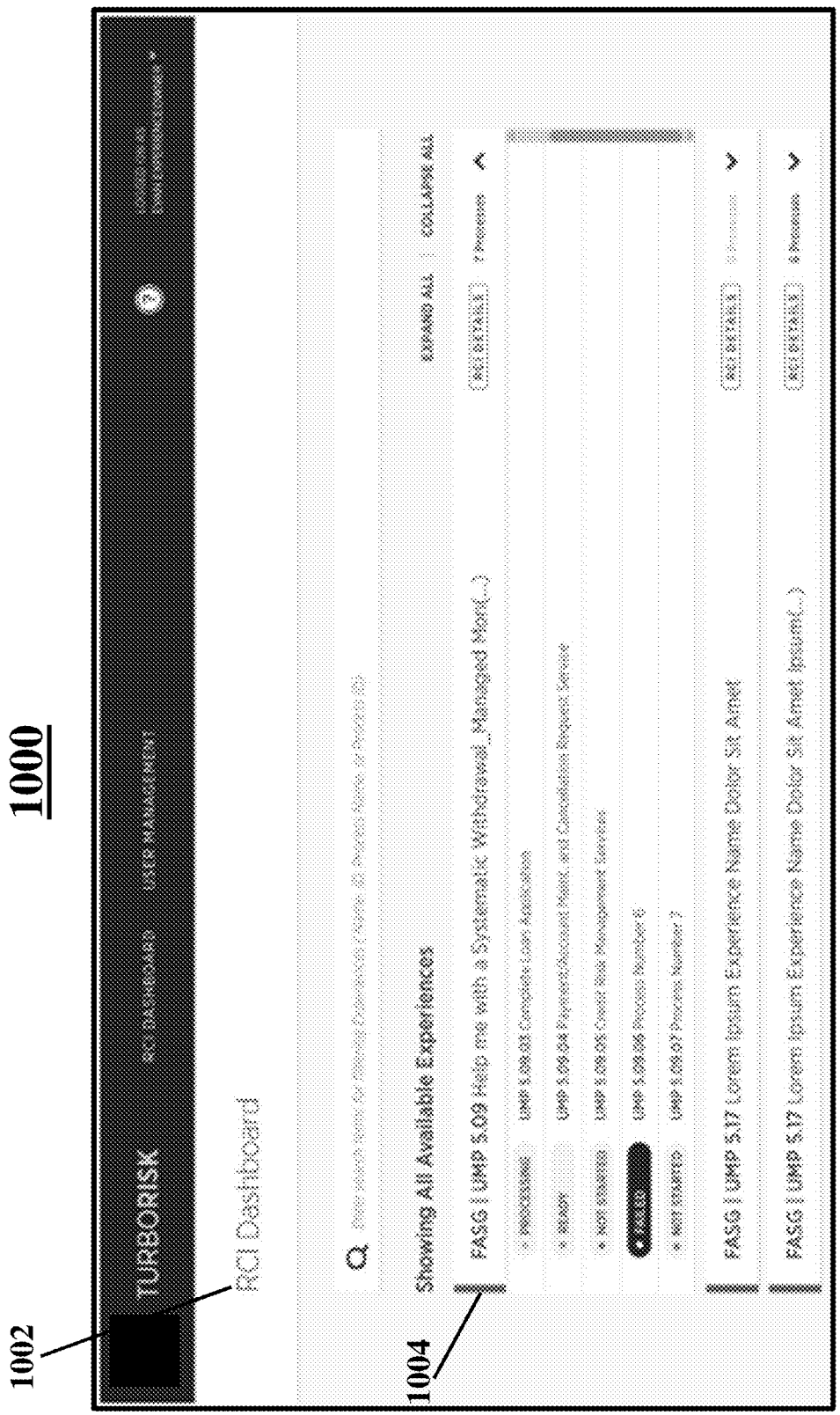
FIG. 10C shows a graphical user interface displaying a status of all available experiences on a software-based compliance evaluation application launched on a user device, according to an embodiment.

When the user interacts with a first feature of the software-based compliance evaluation application, a Risk and Compliance Interface (RCI) dashboard page 1002 of the software-based compliance evaluation application is displayed on the graphical user interface 1000 of the user device, as depicted in the FIGS. 10A-C. The RCI dashboard page 1002 may depict multiple selectable graphical components representing multiple available experiences or tasks. When the user interacts with a first selectable graphical component 1004 representing a first experience or task, multiple subinterfaces are displayed. The multiple subinterfaces may depict a status of each service application associated with the first expenence or task. The status may be incomplete, processing, ready, not started, or failed.

Figure 10D:
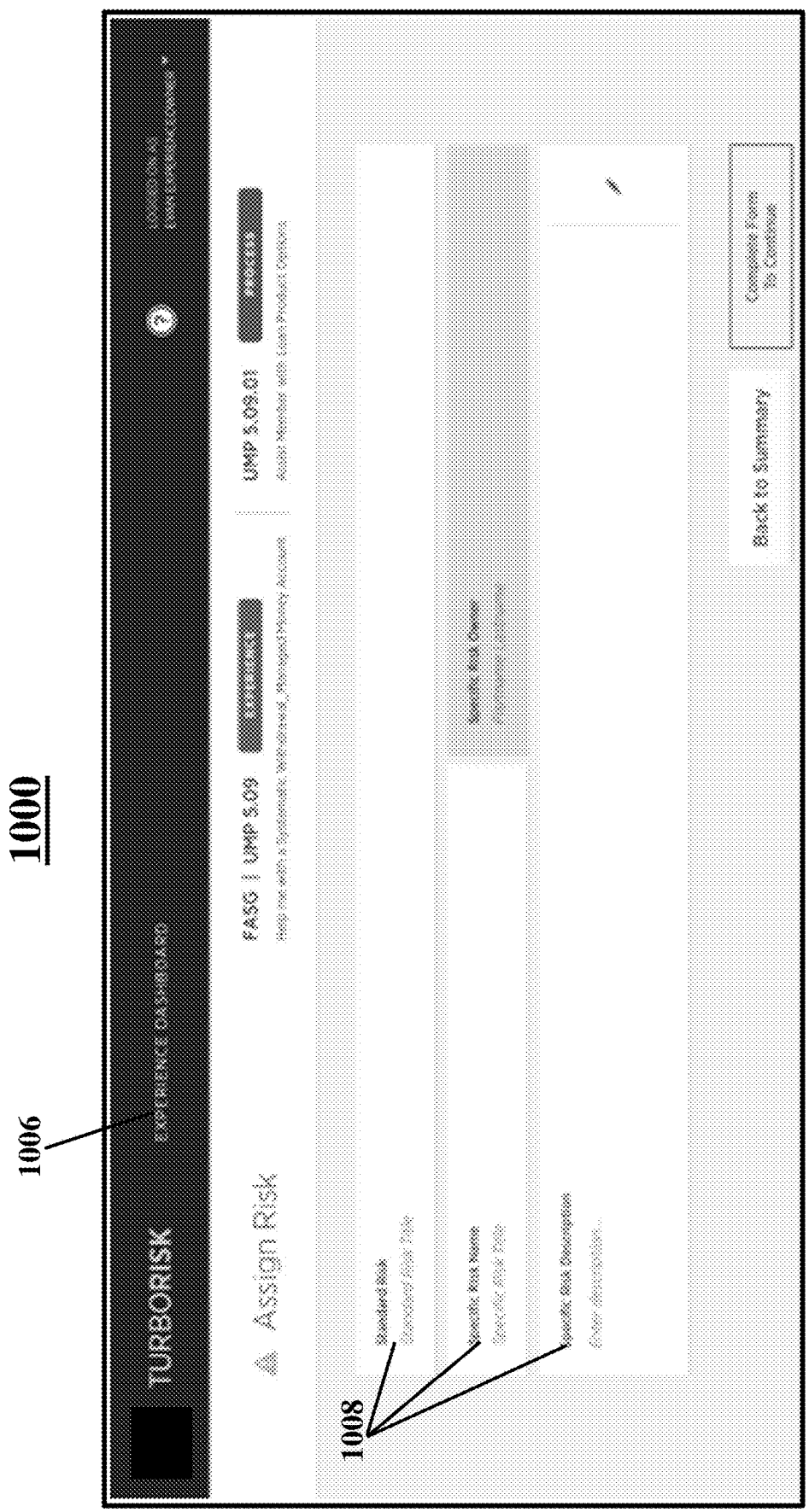
FIG. 10D shows a graphical user interface displaying a form on a software-based compliance evaluation application launched on a user device, according to an embodiment.
Figure 10E:
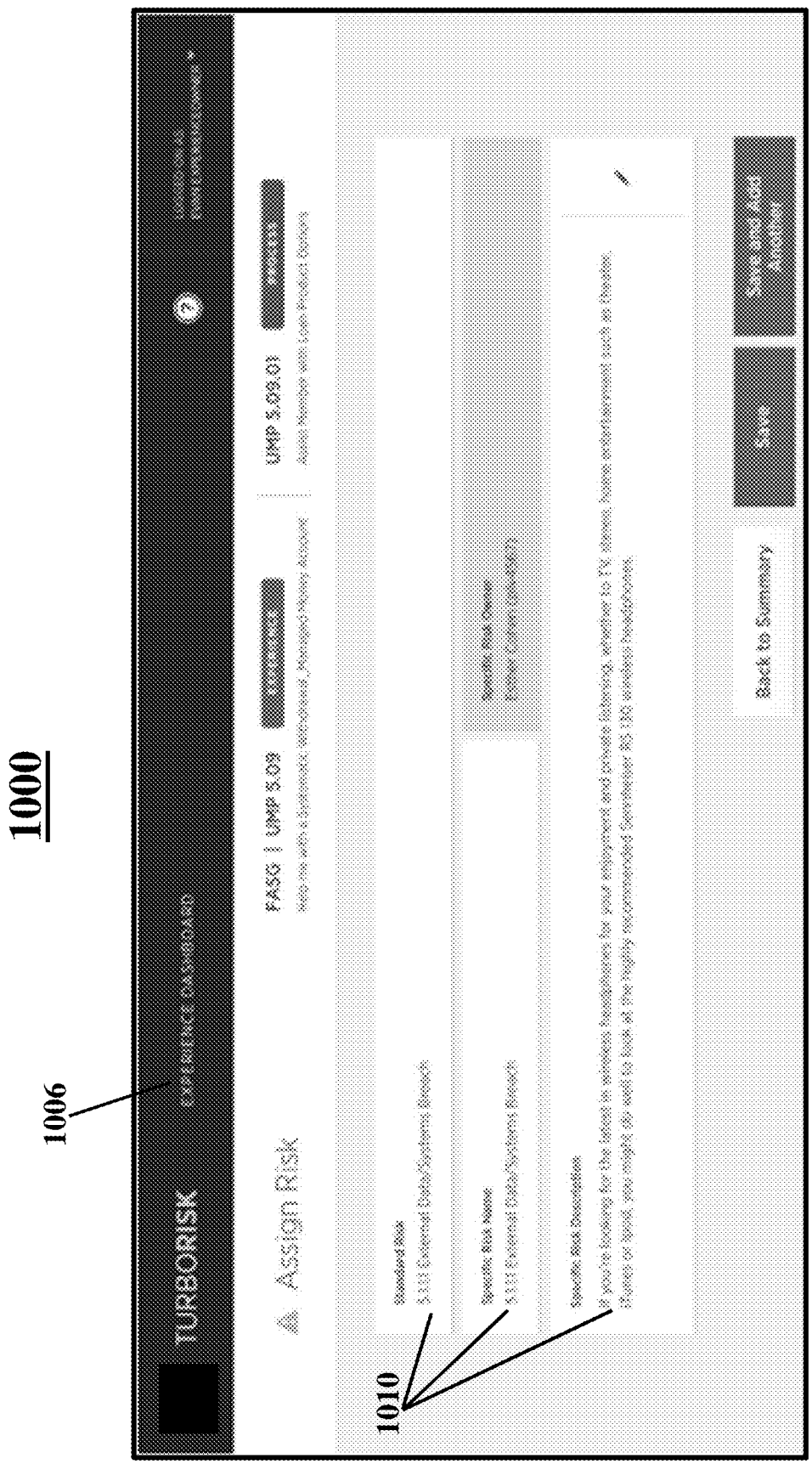
FIG. 10E shows a graphical user interface displaying a form on a software-based compliance evaluation application launched on a user device, according to an embodiment.

When the user interacts with a second feature of the software-based compliance evaluation application, a first experience dashboard page 1006 of the software-based compliance evaluation application is displayed on the graphical user interface 1000 of the user device, as depicted in the FIGS. 10D-E. The first experience dashboard page 1006 may depict a form associated with a particular software program. The form may include a first set of risk questions 1008. The first set of risk questions 1008 may include a question related to defining a title of standard risk, a question related to defining a title of specific risk, and a question related to defining specific risk descriptions. The user may submit a first set of answers 1010 for the first set of risk questions 1008. A second set of questions may then be presented on the first experience dashboard page 1006 based on a hierarchy file and the first set of answers 1010.

Figure 10F:
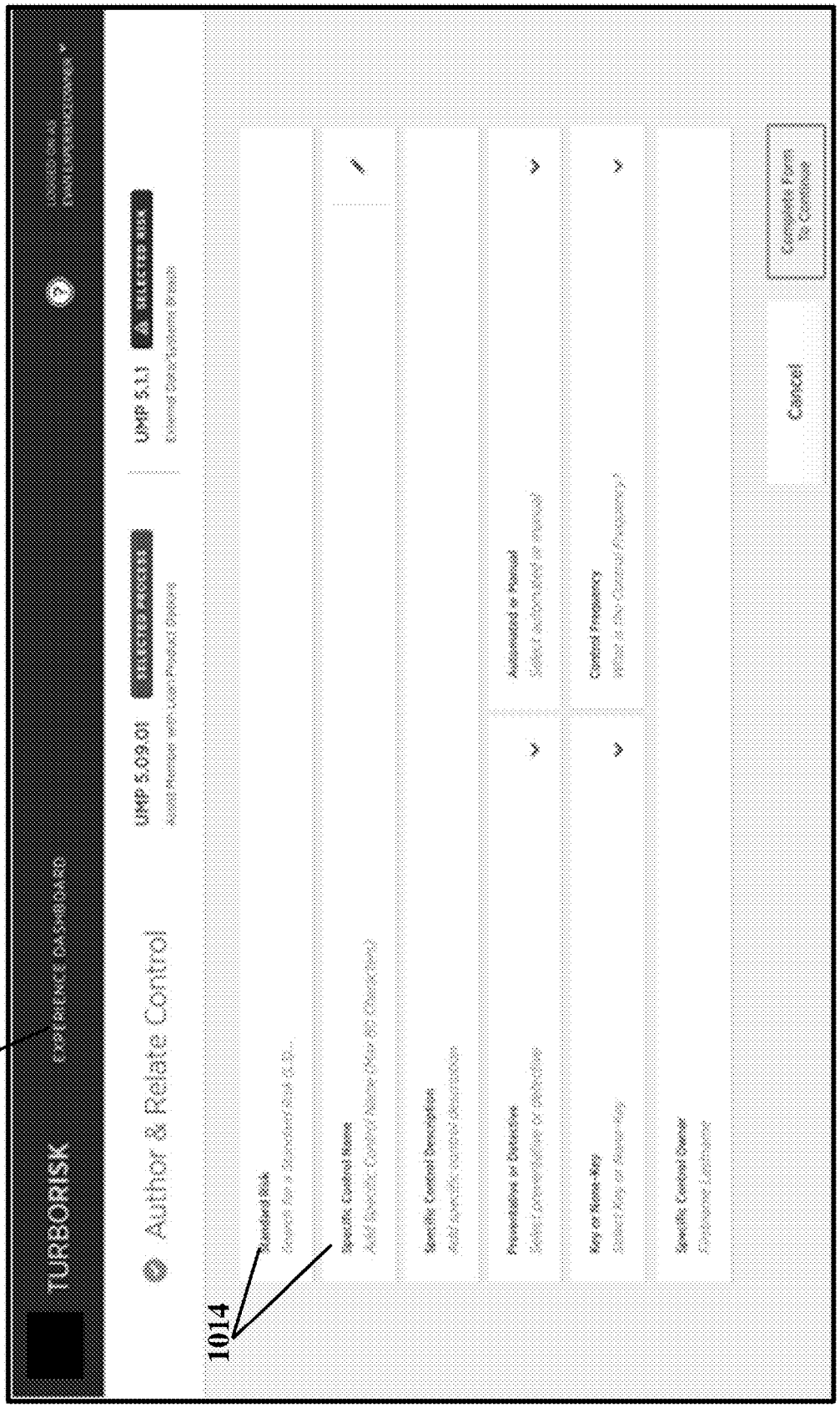
FIG. 10F shows a graphical user interface displaying a form on a software-based compliance evaluation application launched on a user device, according to an embodiment.
Figure 10G:
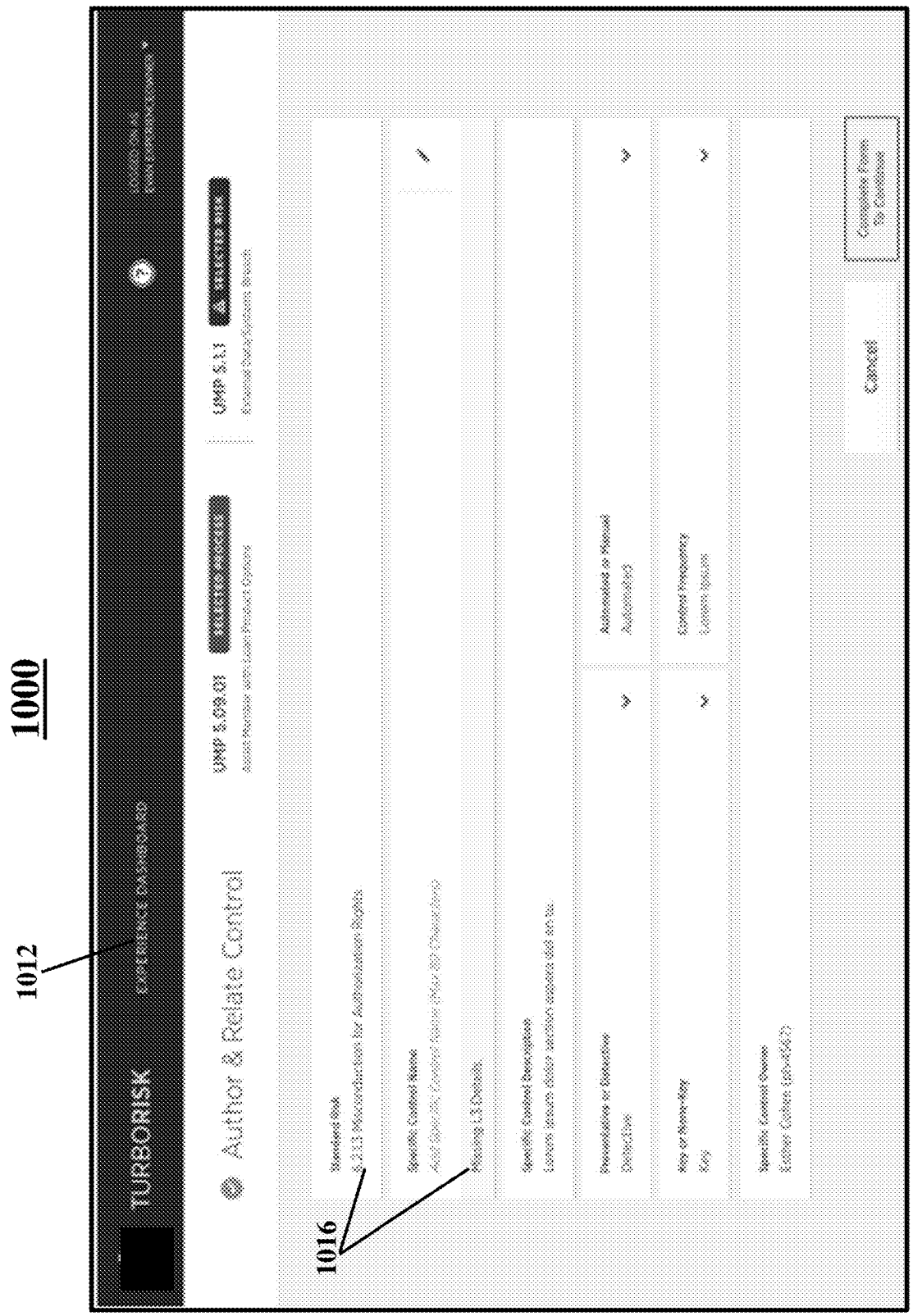
FIG. 10G shows a graphical user interface displaying a form on a software-based compliance evaluation application launched on a user device, according to an embodiment.

When the user interacts with a third feature of the software-based compliance evaluation application, a second experience dashboard page 1012 of the software-based compliance evaluation application is displayed on the graphical user interface 1000 of the user device, as depicted in the FIGS. 10F-G. The second experience dashboard page 1012 may depict a form associated with a particular software program. The form may include a first set of risk and control questions 1014. The first set of risk and control questions 1008 may include a question related to defining a title of standard risk, a question related to defining a title of control name, etc. The user may submit a first set of answers 1016 for the first set of risk and control questions 1014. A second set of risk and control questions may then be presented on the second experience dashboard page 1012 based on the hierarchy file and the first set of answers 1016.

Figure 10H:
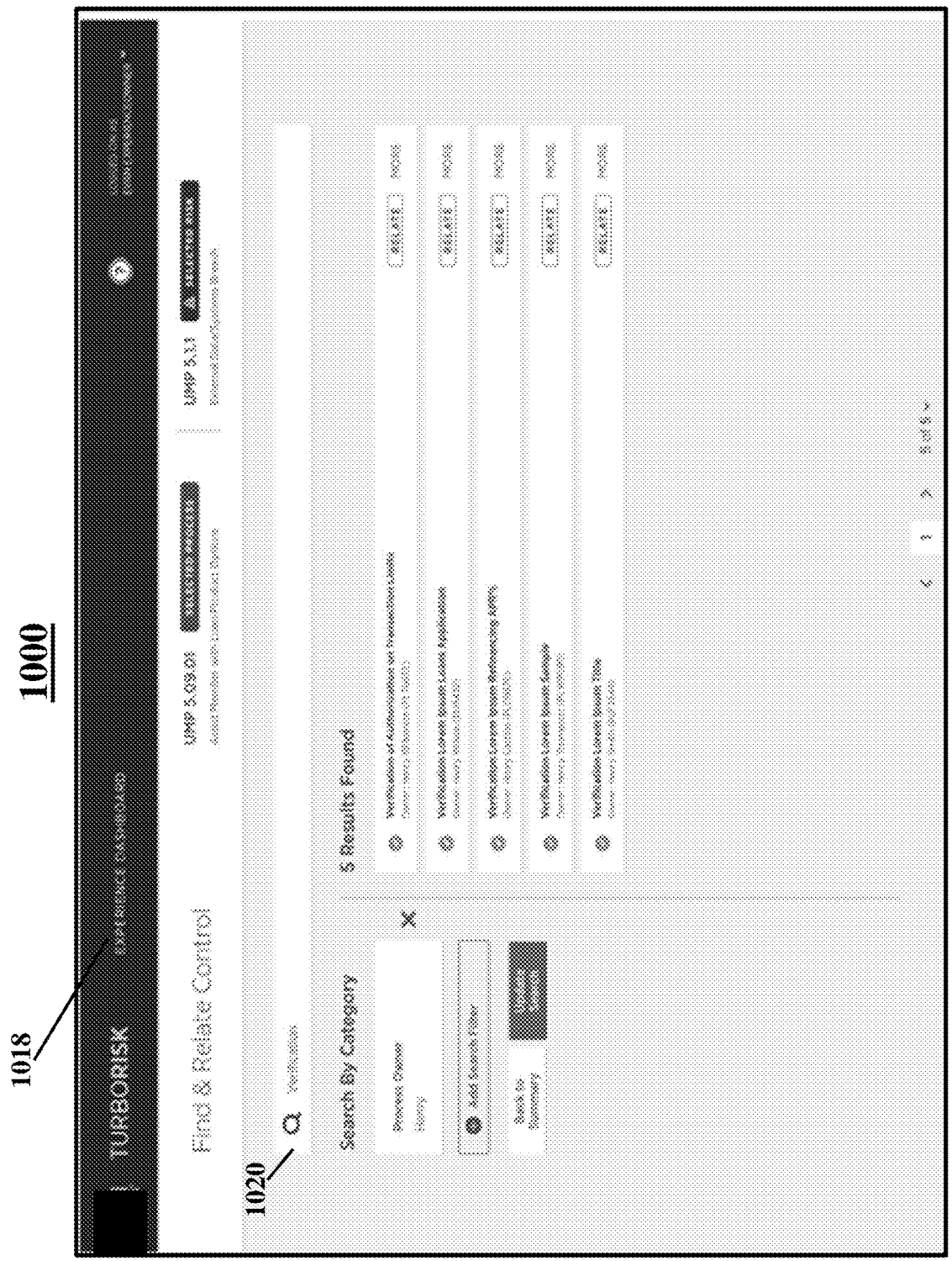
FIG. 10H shows a graphical user interface displaying a search field on a software-based compliance evaluation application launched on a user device, according to an embodiment.
Figure 10I:
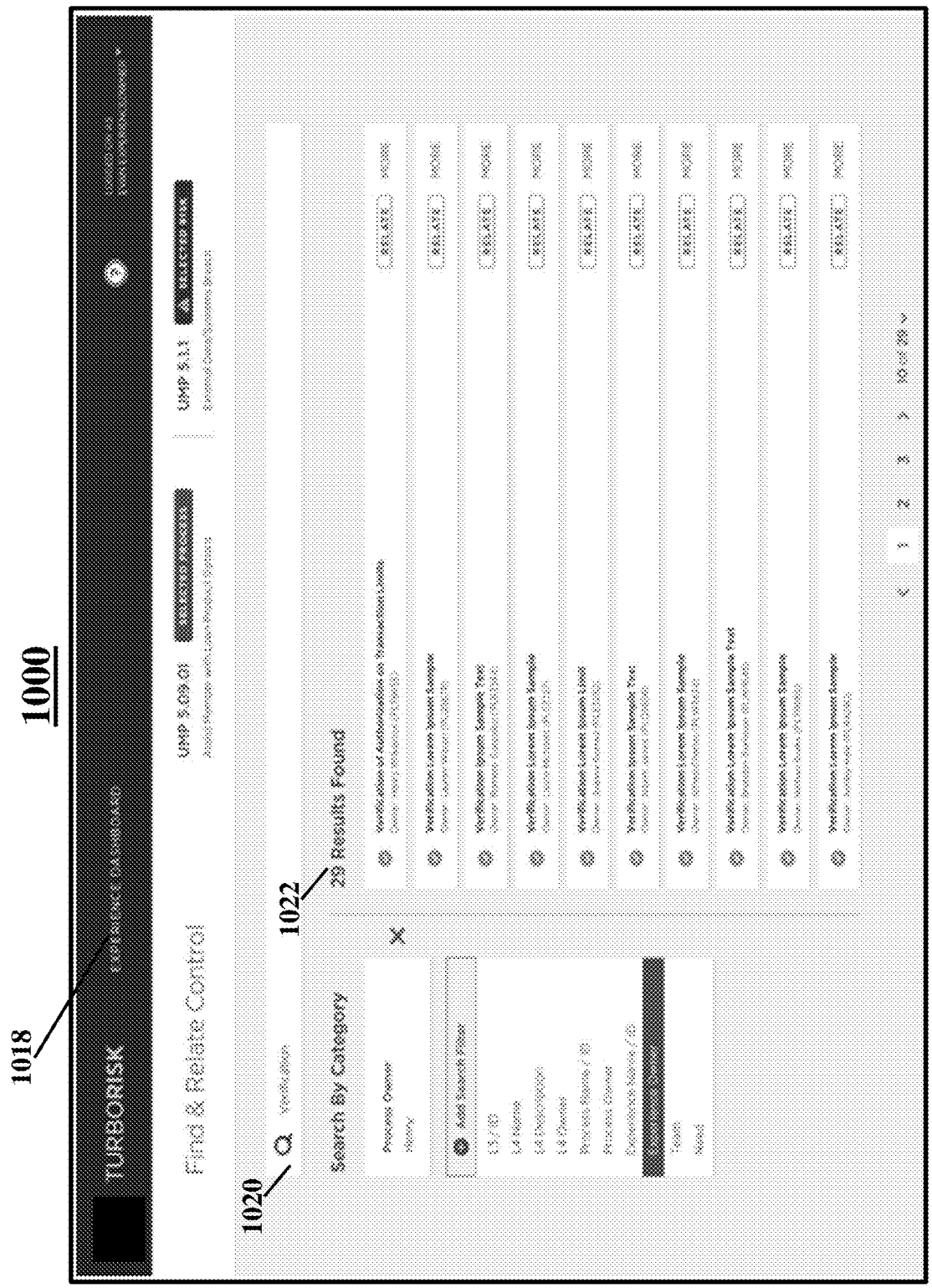
FIG. 10I shows a graphical user interface displaying a search field on a software-based compliance evaluation application launched on a user device, according to an embodiment.

When the user interacts with a fourth feature of the software-based compliance evaluation application, a third experience dashboard page 1018 of the software-based compliance evaluation application is displayed on the graphical user interface 1000 of the user device, as depicted in the FIGS. 10H-I. The third experience dashboard page 1018 may depict a search box. The user may submit one or more terms in the search box 1020. In response to submitting a first term in the search box 1020, results 1022 associated with the first term are presented.

Figure 11A:
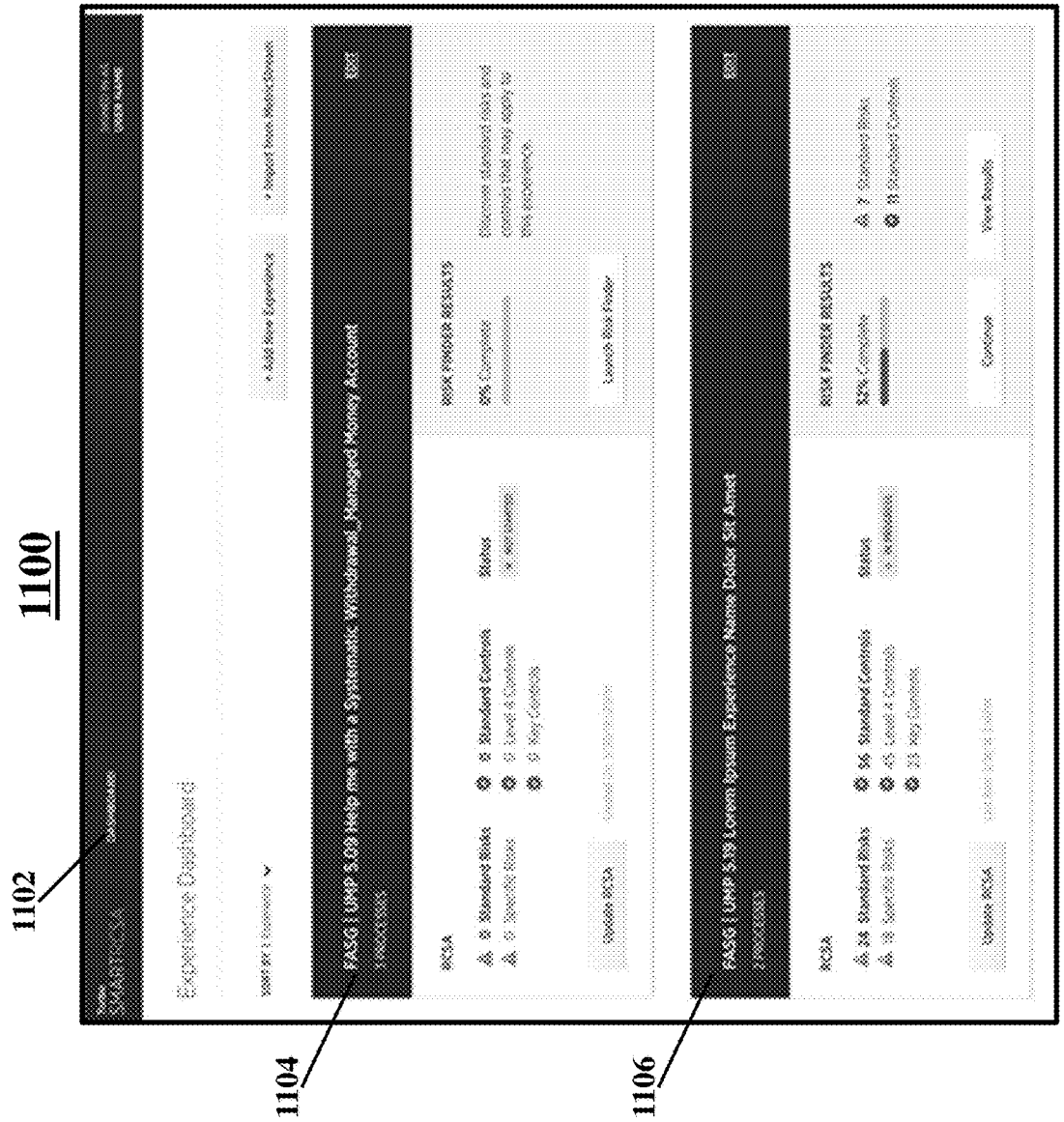
FIG. 11A shows a graphical user interface displaying a software-based compliance evaluation application launched on a user device, according to an embodiment.

FIGS. 11A-10F show a graphical user interface 1100 displaying a software-based compliance evaluation application launched on a user device. The user device may be a desktop computer of a user. The user may install the software-based compliance evaluation application on the user device or use as a user-centric website. The user may interact with various features of the software-based compliance evaluation application.

When the user interacts with a first feature of the software-based compliance evaluation application, a dashboard 1102 of the software-based compliance evaluation application is displayed on the graphical user interface 1100 of the user device, as depicted in the FIG. 11A. The dashboard 1102 may depict multiple selectable graphical components representing multiple software programs. When the user interacts with a first selectable graphical component 1104 representing a first software program, multiple sub-interfaces are displayed. The multiple sub-interfaces may depict a result of an evaluation the first software program. The result may include a status of each of a number of standard risks and a number of standard controls associated with the first software program. When the user interacts with a second selectable graphical component 1106 representing a second software program, multiple subinterfaces are displayed. The multiple sub-interfaces may depict a result of an evaluation the second software program. The result may include a status of each of a number of standard risks and a number of standard controls associated with the second software program. A score may be assigned to each standard risk and standard control. A request may be generated based on the score. Each request may be transmitted to an analyst computer based on analyst credentials associated with an analyst operating the analyst computer.

Figure 11B:
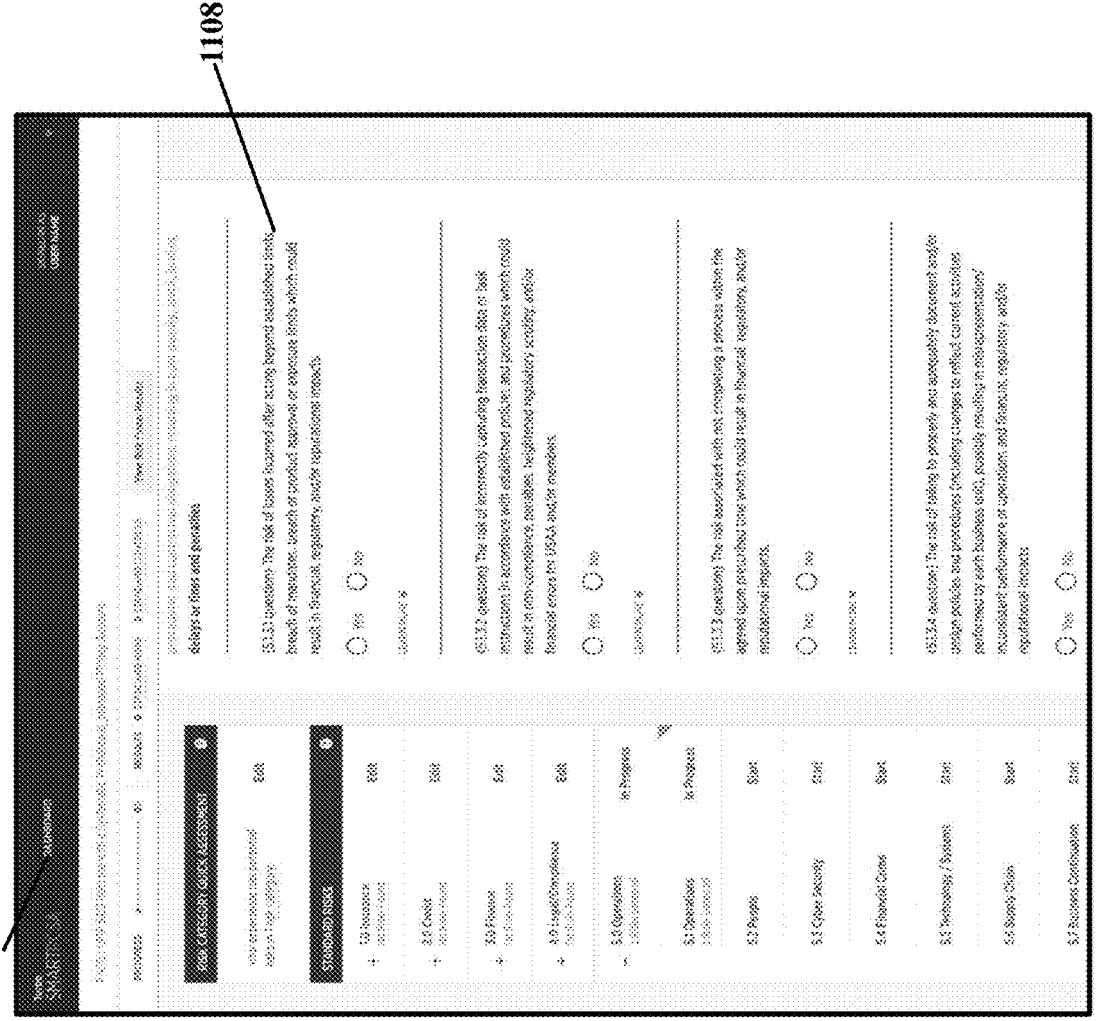
FIG. 11B shows a graphical user interface displaying a software-based compliance evaluation application launched on a user device, according to an embodiment.
Figure 11C:
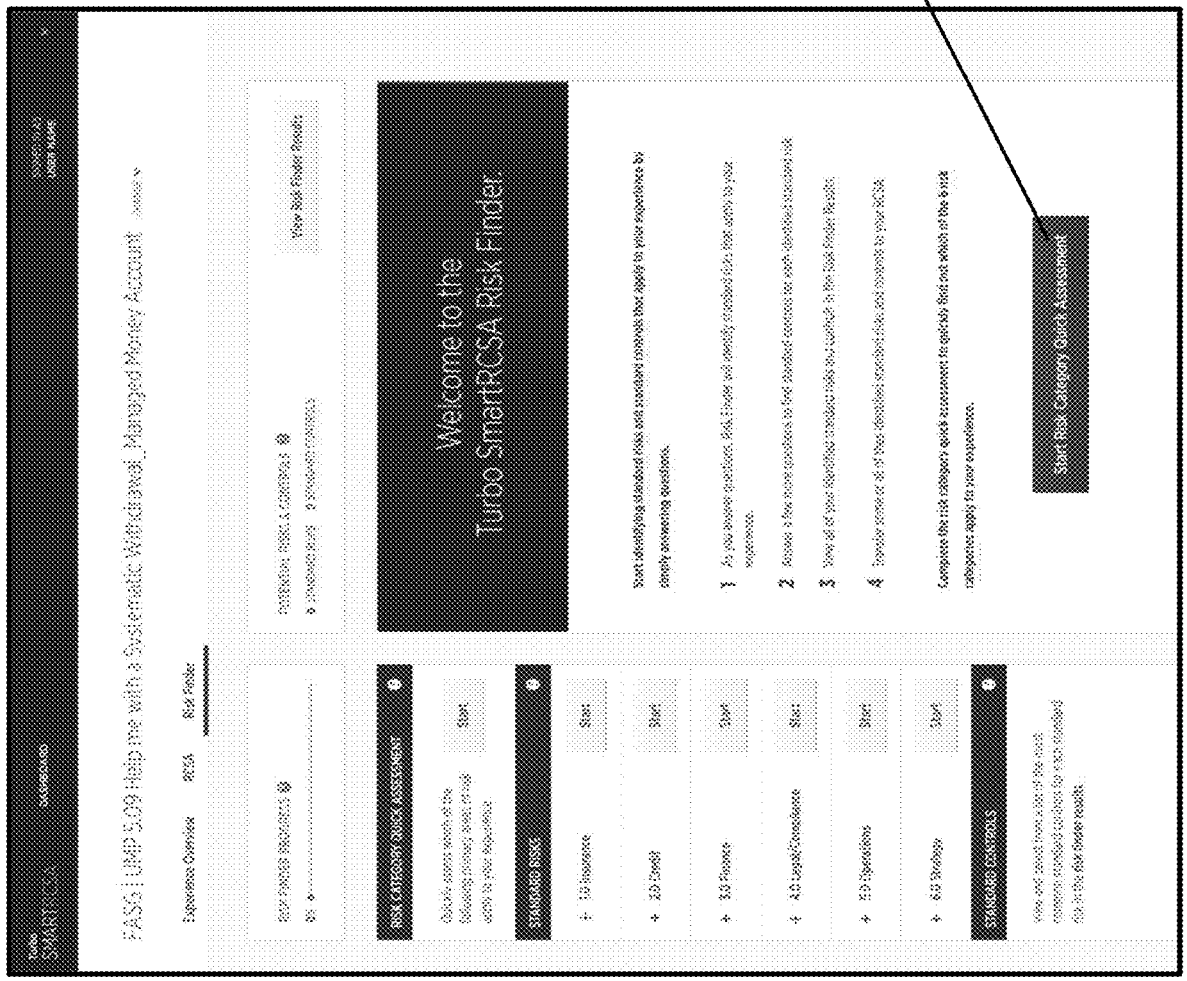
FIG. 11C shows a graphical user interface displaying a software-based compliance evaluation application launched on a user device, according to an embodiment.
Figure 11D:
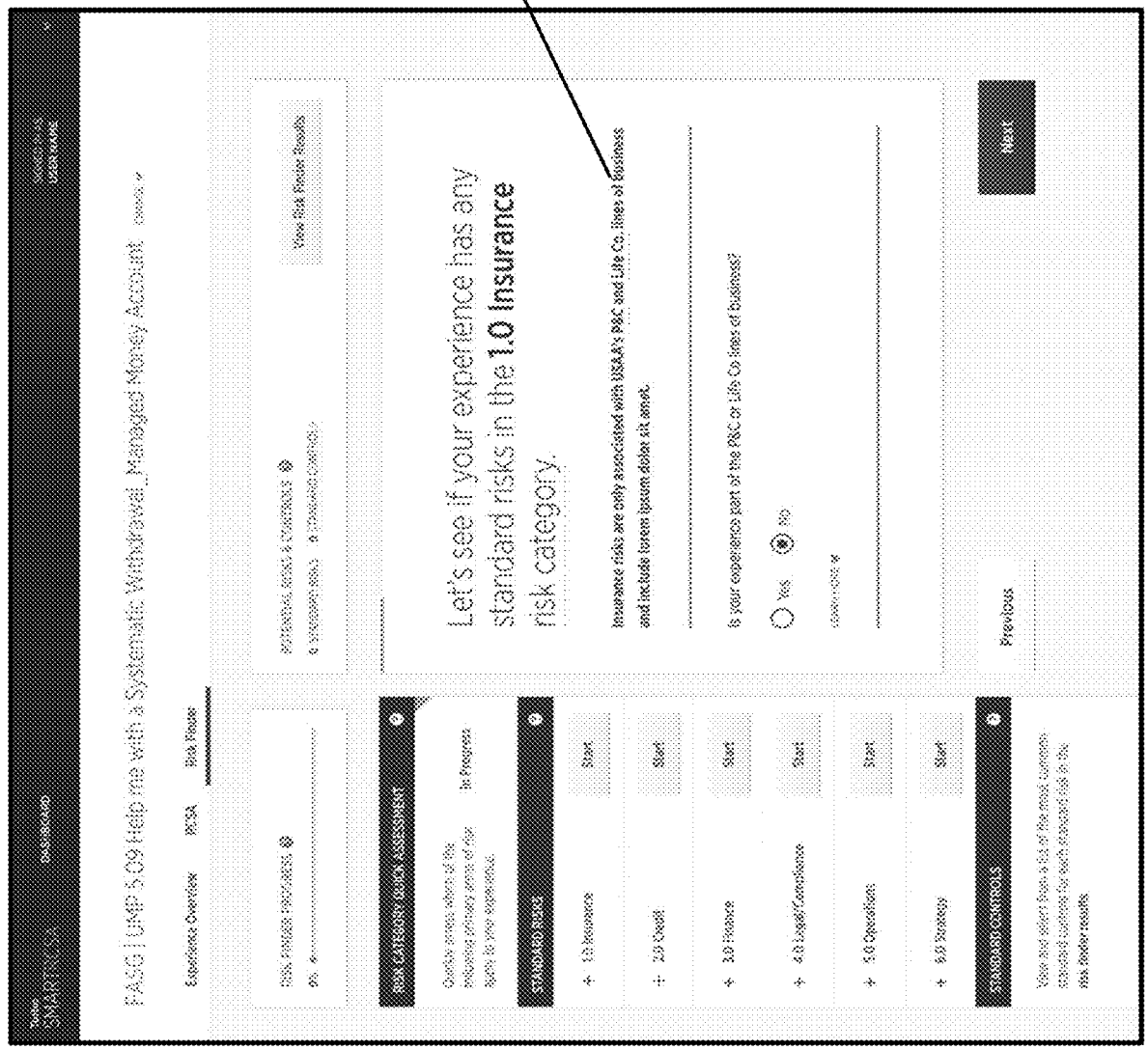
FIG. 11D shows a graphical user interface displaying a software-based compliance evaluation application launched on a user device, according to an embodiment.
Figure 11E:
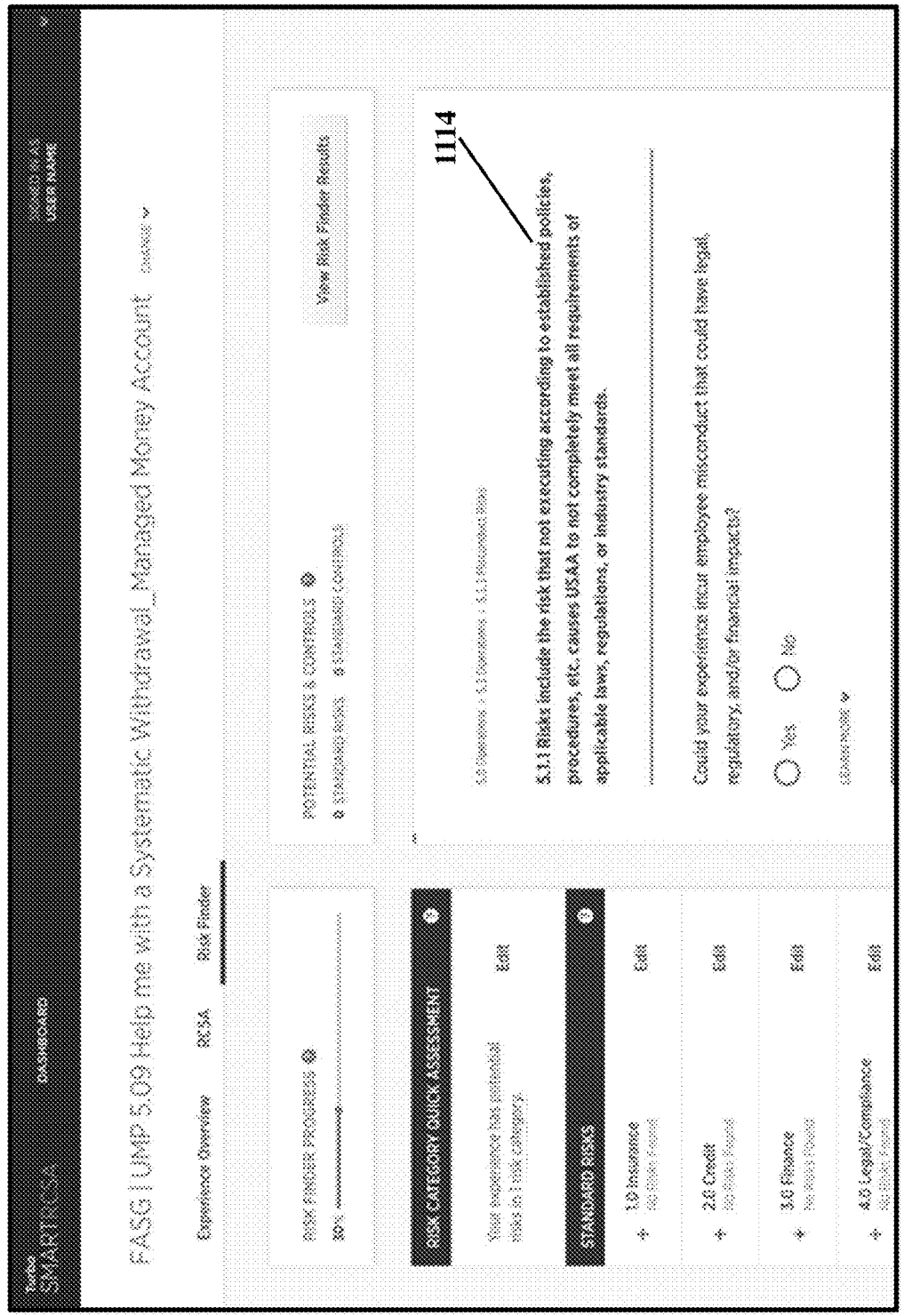
FIG. 11E shows a graphical user interface displaying a software-based compliance evaluation application launched on a user device, according to an embodiment.
Figure 11F:
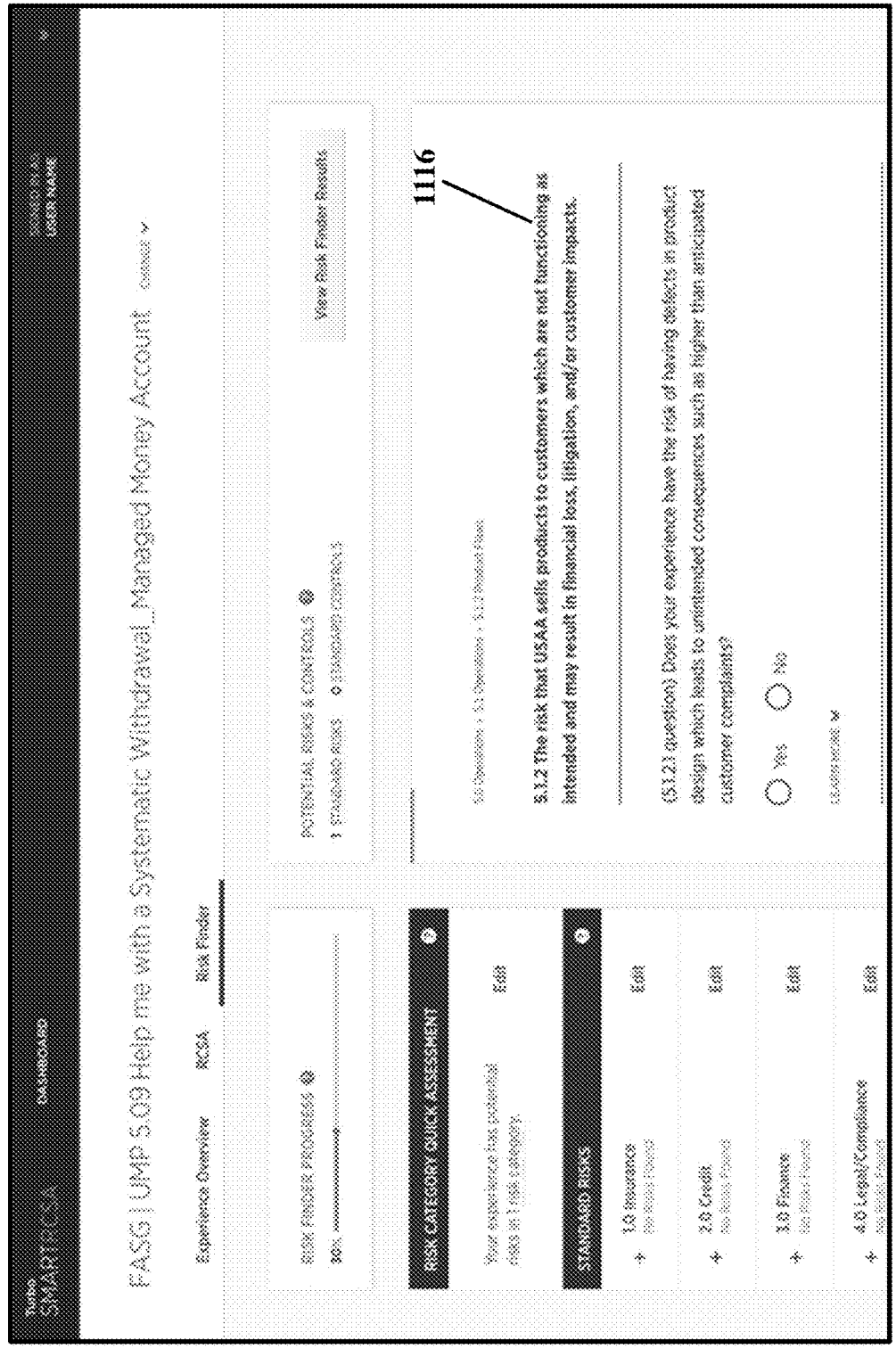
FIG. 11F shows a graphical user interface displaying a software-based compliance evaluation application launched on a user device, according to an embodiment.

When the user interacts with a second feature of the software-based compliance evaluation application, a dashboard 1102 of the software-based compliance evaluation application is displayed on the graphical user interface 1100 of the user device, as depicted in the FIG. 11B. The dashboard 1102 may present a questionnaire associated with a software program. The questionnaire may include one or more questions 1108.

When the user interacts with a third feature of the software-based compliance evaluation application, a new page of the software-based compliance evaluation application is displayed on the graphical user interface 1100 of the user device, as depicted in the FIGS. 11C-F. The new page may depict a selectable graphical component 1110. When the user interacts with the selectable graphical component 1110, a sub-interface is displayed. The sub-interface may present a questionnaire associated with a software program. The questionnaire may include a first question 1112. The user may submit a first answer for the first question 1112. A second question 1114 is presented on a new page based on a hierarchy file and the first answer. The user may submit a second answer for the second question 1114. A third question 1116 is presented on a new page based on the hierarchy file and the second answer.

Even though embodiments described herein describe methods and systems to identify one or more risks and controls associated with implementation of software programs/protocols, the methods and systems described herein are not limited to software programs. For instance, the methods and systems described herein can be applied to any operational process performed by an internal or external server of an organization. Furthermore, the methods and systems described herein can identify the one or more risks and controls for multiple processes implementing multiple software programs. For example, when the system server receives a task to be performed, the system server can map a sequence of the multiple processes to be performed when accomplishing the task. The system server may then identify a holistic risk/control for the task.

In a non-limiting example, the system server may receive a task where the task corresponds to transferring money from account A to account B. The system server may first query and identify one or more processes involved in transferring money from the account A to the account B. The system server may identify that three processes are involved in transferring money from the account A to the account B. The system server then retrieves risk/control associated with identified processes (generated using the methods and systems described above) and generates a holistic risk/control guideline for transferring money from the account A to the account B. This non-limiting example can be replicated for any operational process within an organization.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via memory sharing, message passing, token passing, network transmission, or the like.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
   for each of a plurality of software programs, generating, by a server for transmission to a user device among a plurality of user devices, a questionnaire by executing a hierarchy file that contains a structure for respective paths and sequences of user interfaces for presentation on the user device receiving the questionnaire and dynamically adjusts the questionnaire based upon input from the user device;
   executing, by the server, one or more scoring algorithms to score each input from each questionnaire presented on each user device;
   generating, by the server, one or more requests based on a score associated with each input from the questionnaire for each software program, wherein the one or more requests comprises a first request based on a first input representing a first attribute of a first software program and a second request based on a second input representing a second attribute of the first software program;
   determining, by the server in response to a triggering event, wherein the triggering event comprises a notification for a user identifier associated with the one or more requests, a first priority level associated with the first request and a second priority level associated with the second request; and
   routing, by the server and based on the first priority level and the second priority level, the first request to a first analyst computer configured to perform a first verification on the first request and the second request to a second analyst computer configured to perform a second verification on the second request.

2. The server-implemented method of claim 1, further comprising displaying, by the server on an admin computing device, a first graphical user interface comprising a first plurality of input fields associated with a software-based compliance evaluation application.

3. The server-implemented method of claim 2, wherein the first plurality of input fields comprise a first input field configured to receive an alphanumerical string representing a first question of one or more questions of the questionnaire, a second input field configured to receive an identifier corresponding to the first question, and a third input field configured to assign a score corresponding to a first input response to the first question.

4. The server-implemented method of claim 3, further comprising displaying, by the server on the admin computing device, a second graphical user interface comprising a second plurality of input fields associated with the software-based compliance evaluation application.

5. The server-implemented method of claim 4, wherein the second plurality of input fields are configured to receive identifiers for the one or more questions and a selection of a corresponding next question of the questionnaire based on a response to the first question.

6. The server-implemented method of claim 5, further comprising generating, by the server, the hierarchy file corresponding to inputs received from the admin computing device in response to the first plurality of input fields and the second plurality of input fields.

7. The server-implemented method of claim 6, further comprising receiving, by the server from a first user device, first data associated with a first input response to the first question on a first graphical user interface displayed on the user device.

8. The server-implemented method of claim 6, further comprising storing, by the server, the hierarchy file in a non-transitory computer readable medium associated with a database.

9. The server-implemented method of claim 1, wherein the questionnaire is configured to launch another questionnaire based on the user device completing the questionnaire.

10. A system comprising:
   a server configured to:
      for each of a plurality of software programs, generate for transmission to a user device among a plurality of user devices, a questionnaire by executing a hierarchy file that contains a structure for respective paths and sequences of user interfaces for presentation on the user device receiving the questionnaire and dynamically adjusts the questionnaire based upon input from the user device;
      execute one or more scoring algorithms to score each input from each questionnaire presented on each user device;
      generate one or more requests based on a score associated with each input from the questionnaire for each software program, wherein the one or more requests comprises a first request based on a first input representing a first attribute of a first software program and a second request based on a second input representing a second attribute of the first software program;
      determine, in response to a triggering event, wherein the triggering event comprises a notification for a user identifier associated with the one or more requests, a first priority level associated with the first request and a second priority level associated with the second request; and
      route the first request to a first analyst computer configured to perform a first verification on the first request and the second request to a second analyst computer configured to perform a second verification on the second request.

11. The system of claim 10, wherein the server is further configured to display on an admin computing device, a first graphical user interface comprising a first plurality of input fields associated with a software-based compliance evaluation application.

12. The system of claim 11, wherein the first plurality of input fields comprise a first input field configured to receive an alphanumerical string representing a first question of one or more questions of the questionnaire, a second input field configured to receive an identifier corresponding to the first question, and a third input field configured to assign a score corresponding to a first input response to the first question.

13. The system of claim 12, wherein the server is further configured to display on the admin computing device, a second graphical user interface comprising a second plurality of input fields associated with the software-based compliance evaluation application.

14. The system of claim 13, wherein the second plurality of input fields are configured to receive identifiers for the one or more questions and a selection of a corresponding next question of the questionnaire based on a response to the first question.

15. The system of claim 14, wherein the server is further configured to generate the hierarchy file corresponding to inputs received from the admin computing device in response to the first plurality of input fields and the second plurality of input fields.

16. The system of claim 15, wherein the server is further configured to receive from a first user device, first data associated with a first input response to the first question on a first graphical user interface displayed on the user device.

17. The system of claim 16, wherein the server is further configured to determine a second question to be displayed on a second graphical user interface based on the hierarchy file and the first data.

18. The system of claim 15, wherein the server is further configured to store the hierarchy file in a non-transitory computer readable medium associated with a database.

* * * * *